United States Patent
Huang et al.

(10) Patent No.: US 9,049,742 B2
(45) Date of Patent: Jun. 2, 2015

(54) METHOD FOR FORMING WIRELESS COMMUNICATION GROUPS

(75) Inventors: Ching-Yao Huang, New Taipei (TW); Chih-Yuan Tu, New Taipei (TW); Chieh-Yuan Ho, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 438 days.

(21) Appl. No.: 13/568,143

(22) Filed: Aug. 7, 2012

(65) Prior Publication Data

US 2013/0045766 A1 Feb. 21, 2013

Related U.S. Application Data

(60) Provisional application No. 61/523,415, filed on Aug. 15, 2011.

(30) Foreign Application Priority Data

Mar. 8, 2012 (TW) .............................. 101107840 A

(51) Int. Cl.
*H04W 88/04* (2009.01)
*H04W 84/04* (2009.01)

(52) U.S. Cl.
CPC ............ *H04W 88/04* (2013.01); *H04W 84/047* (2013.01); *Y02B 60/50* (2013.01)

(58) Field of Classification Search
CPC .................................................. H04W 84/047
See application file for complete search history.

(56) References Cited

U.S. PATENT DOCUMENTS

| | | | |
|---|---|---|---|
| 7,477,621 B1* | 1/2009 | Loc et al. ....................... | 370/329 |
| 2005/0119006 A1* | 6/2005 | Cave et al. .................... | 455/453 |
| 2005/0249161 A1* | 11/2005 | Carlton ......................... | 370/331 |
| 2006/0258350 A1* | 11/2006 | Roy et al. .................... | 455/435.1 |
| 2008/0008116 A1* | 1/2008 | Buga et al. ..................... | 370/328 |
| 2008/0151801 A1* | 6/2008 | Mizuta ........................... | 370/311 |
| 2009/0190500 A1* | 7/2009 | Ji et al. .......................... | 370/254 |
| 2009/0252104 A1* | 10/2009 | Zhang et al. .................. | 370/329 |
| 2010/0216477 A1* | 8/2010 | Ryan ............................. | 455/449 |

(Continued)

FOREIGN PATENT DOCUMENTS

| | | |
|---|---|---|
| CN | 102111844 A | 6/2011 |
| EP | 1 855 492 A1 | 11/2007 |

(Continued)

OTHER PUBLICATIONS

Yang Yang et al., Relay Technologies for WiMAX and LTE-Advanced Mobile Systems, IEEE Communications Magazine, Oct. 2009, pp. 100-105, XP011283322, 2009 IEEE, WiMAX Update, Piscataway, US.

(Continued)

*Primary Examiner* — Bobbak Safaipour
(74) *Attorney, Agent, or Firm* — Winston Hsu; Scott Margo

(57) ABSTRACT

An method for forming wireless communications groups applied in a wireless communications system includes selecting g coordinators from n wireless communications devices around a base station, allocating remaining (n−g) wireless communications devices of the n wireless communications devices to the g coordinators to form g wireless communications groups, reselecting a coordinator from each wireless communications group to generate g updated coordinators, and allocating remaining (n−g) wireless communications devices of the n wireless communications devices to the g updated coordinators to form g updated wireless communications groups.

12 Claims, 21 Drawing Sheets

(56) References Cited

U.S. PATENT DOCUMENTS

| | | | |
|---|---|---|---|
| 2010/0220676 A1* | 9/2010 | Grandblaise et al. | 370/329 |
| 2011/0028144 A1* | 2/2011 | Catovic et al. | 455/423 |
| 2011/0058478 A1* | 3/2011 | Krym et al. | 370/237 |
| 2012/0278221 A1* | 11/2012 | Fuller et al. | 705/37 |
| 2014/0274174 A1* | 9/2014 | Sekiya et al. | 455/500 |
| 2014/0286294 A1* | 9/2014 | Akiyoshi et al. | 370/329 |
| 2014/0313901 A1* | 10/2014 | Yacovitch | 370/236 |

FOREIGN PATENT DOCUMENTS

| | | | |
|---|---|---|---|
| JP | 2008535326 A | 8/2008 | |
| JP | 2009206560 A | 9/2009 | |
| WO | 2006067922 A1 | 6/2006 | |
| WO | 2006104948 A2 | 10/2006 | |

OTHER PUBLICATIONS

Ralf Pabst et al., Relay-Based Deployment Concepts for Wireless and Mobile Broadband Radio, IEEE Communications Magazine, Sep. 2004, pp. 80-89, XP011119469, 2004 IEEE, Wireless World Research Forum, Piscataway, US.

* cited by examiner

US 9,049,742 B2

METHOD FOR FORMING WIRELESS COMMUNICATION GROUPS

CROSS REFERENCE TO RELATED APPLICATIONS

This application claims the benefit of U.S. Provisional Application No. 61/523,415, filed on Aug. 15, 2011, which is incorporated herein by reference.

BACKGROUND OF THE INVENTION

1. Field of the Invention

The present invention relates to a method for forming wireless communications groups applied in a wireless communications system, especially to a method for forming wireless communications groups applied in a wireless communications system according to different transmission criteria.

2. Description of the Prior Art

Wireless communications techniques such as global system for mobile communications (GSM), the third generation communications system (3G) and Worldwide Interoperability for Microwave Access (WiMAX) are widely used nowadays to provide convenient wireless communications services. In the present communication method, each wireless communications device links to a base station separately to receive data from the base station or transmit data to the base station. When a great number of wireless communications devices are to be linked to the base station at the same time, using the above method to receive data from the base station or transmit data to the base station may cause overloading of the base station. It will result in unexpected power loss during uplink or downlink, and reducing the life span of the wireless communications devices.

SUMMARY OF THE INVENTION

An embodiment of the present invention relates to a method for forming wireless communications groups applied in a wireless communications system. The method includes selecting g coordinators from n wireless communications devices near a base station, allocating remaining (n−g) wireless communications devices of the n wireless communications devices to the g coordinators to form g wireless communications groups, reselecting a coordinator from each wireless communications group to generate g updated coordinators, and allocating remaining (n−g) wireless communications devices of the n wireless communications devices to the g updated coordinators to form g updated wireless communications groups.

In the embodiments provided by the present invention, the step of selecting coordinators in the wireless communications system and the step of grouping the wireless communications devices as wireless communications groups according to the selected coordinators are alternatively performed. After performing the above two steps, the wireless communications devices in the wireless communications device groups transmit signals to a coordinator first, and then the coordinator transmits the received signals to a target base station, or the coordinator receives signals from the target base station first, and then transmits the received signals to the wireless communications devices in the wireless communications device groups. Besides, via grouping the wireless communications devices as wireless communications groups, the number of the wireless communications devices linking to the base station can be limited, thus improving the efficiency of managing access to the wireless communications devices. Further, via selecting coordinators in the wireless communications devices, the uplink power dissipation of the wireless communications devices can be reduced, and the life span of the wireless communications devices can be extended.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
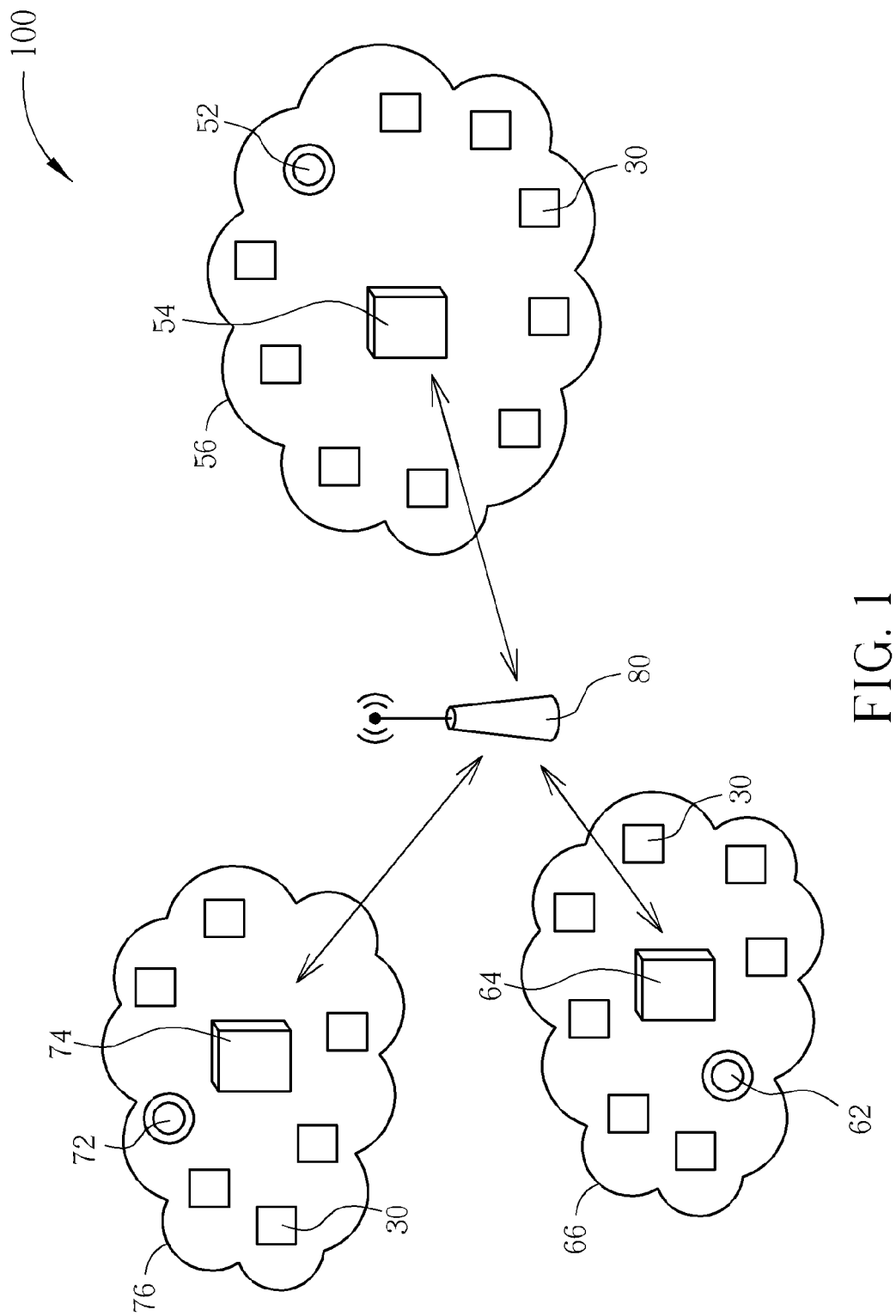
FIG. 1 shows forming wireless communications groups in a wireless communications environment according to an embodiment of the present invention.

Please refer to FIG. 1. FIG. 1 shows forming wireless communications groups in a wireless communications environment according to an embodiment of the present invention. As shown in FIG. 1, three wireless communications devices of n wireless communications devices 30 near a base station 80 are selected as three coordinators 52, 62 and 72 before forming wireless communications groups. The wireless communications devices can be randomly selected. After selecting the coordinators 52, 62 and 72, remaining (n−3) wireless communications devices of the n wireless communications devices 30 are allocated to the coordinators 52, 62 and 72 to form three wireless communications groups 56, 66 and 76, respectively. After selecting the coordinators 52, 62 and 72 and grouping the wireless communications groups 56, 66 and 76, the wireless communications devices in the wireless communications groups 56, 66 and 76 respectively transmit signals to the coordinators 52, 62 and 72 first, and then the coordinators 52, 62 and 72 respectively transmit the received signals to the base station 80, or the coordinators 52, 62 and 72 respectively receive signals from the base station 80 first, and then the coordinators 52, 62 and 72 transmit the received signals to the wireless communications devices in the wireless communications groups 56, 66 and 76.

After forming the wireless communications groups 56, 66 and 76, a coordinator is reselected from each wireless communication group 56, 66 and 76 to generate three updated coordinators 54, 64 and 74. After that, remaining (n−3) wireless communications devices of the n wireless communications devices 30 are allocated to the updated coordinators 54, 64 and 74 to form three updated wireless communications groups. Although in the first embodiment, only three wireless communications devices are selected as coordinators, the present invention is not limited to select only three coordinators, the number of selected coordinators can be adjusted according to different situations, but the number of selected coordinators must not exceed an upper limit defined in the wireless communications specification for the wireless communications environment 100.

Figure 2:
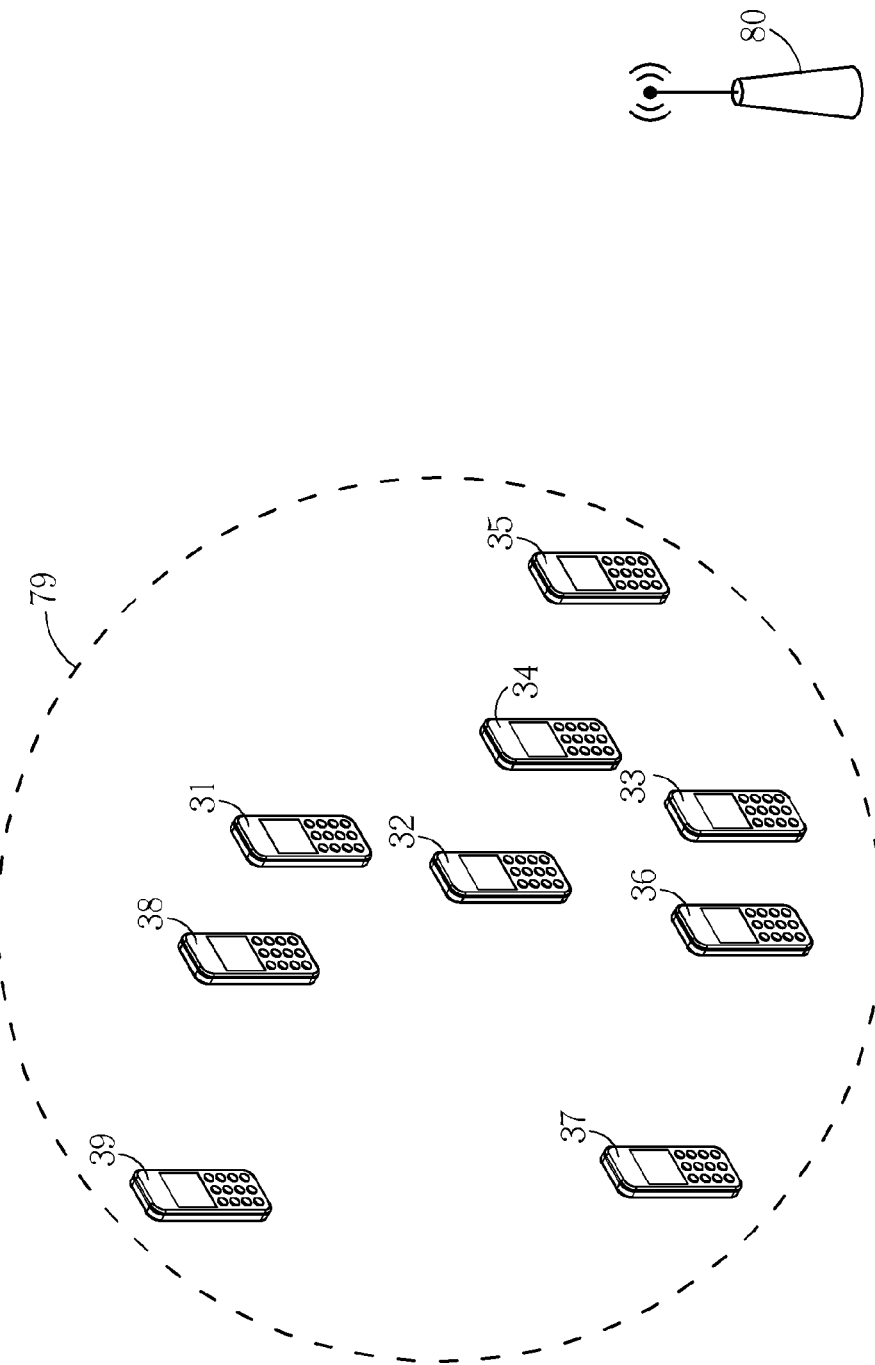
FIG. 2 shows reselecting coordinators in the wireless communications groups according to an embodiment of the present invention.

Please refer to FIG. 2. FIG. 2 shows reselecting a coordinator in a wireless communications group 79 according to an embodiment of the present invention. As shown in FIG. 2, the wireless communications group 79 includes wireless communications devices 31 to 39. Different coordinators may be selected according to different criteria and algorithms when reselecting coordinators. For example, when reselecting a coordinator from the wireless communications group 79 having a maximum sum of channel gains with other wireless communications devices in the wireless communications group 79, in order to adjust power dissipation caused by signal transmission between the remaining wireless communications devices in the wireless communications group 79 and the selected coordinator, the wireless communications device 34 would most likely be selected.

When reselecting a coordinator from the wireless communications group 79 having a maximum product of channel gains with other wireless communications devices in the wireless communications group 79, in order to adjust power dissipation caused by signal transmission between the remaining wireless communications devices in the wireless communications group 79 and the selected coordinator, the wireless communications device 31 or 32 would most likely be selected.

When reselecting a coordinator from the wireless communications group 79 having a maximum channel gain with the base station 80, in order to enhance transmission efficiency between the selected coordinator and the base station 80, the wireless communications device 35 would most likely be selected.

When reselecting a coordinator from the wireless communications group 79 having a median channel gain with the base station 80, in order to adjust transmission efficiency between the selected coordinator and the base station 80, the wireless communications device 32 would most likely be selected.

When reselecting a coordinator from the wireless communications group 79 having a minimal power dissipation with other wireless communications devices in the wireless communication group 79 and the base station 80, in order to minimize power dissipation caused by signal transmission between the remaining wireless communications devices in the wireless communications group 79 and the selected coordinator and signal transmission between the selected coordinator and the base station 80, the wireless communications device 33, 34 or 35 would most likely be selected.

Figure 3:
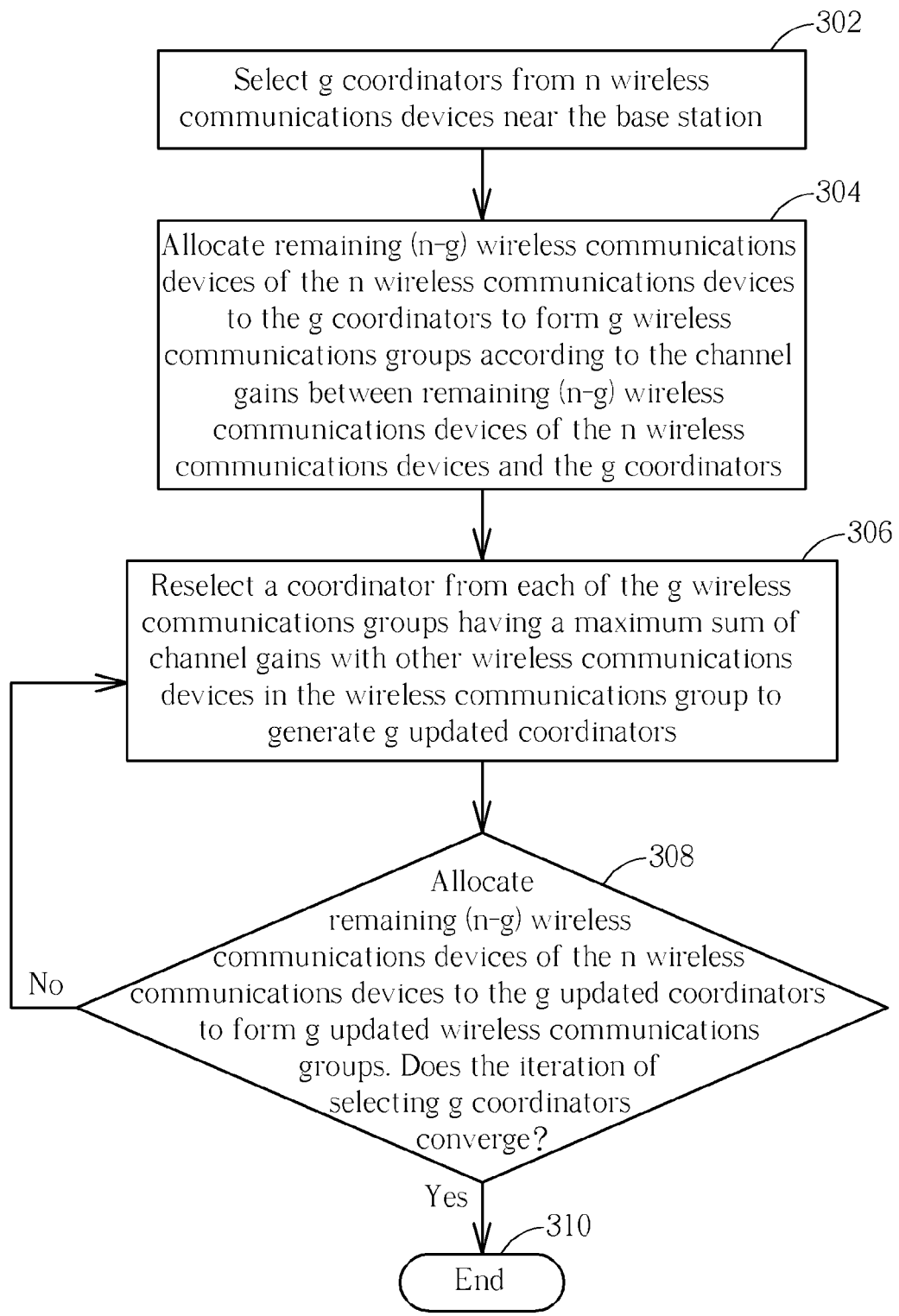
FIG. 3 is a flowchart showing forming wireless communications groups and reselecting coordinators in the wireless communications environment according to a first embodiment of the present invention.

Please refer to FIG. 3. FIG. 3 is a flowchart showing forming wireless communications groups and reselecting coordinators in a wireless communications environment 100 according to a first embodiment of the present invention. The flowchart is described as follows:

Step 302: Select g coordinators from n wireless communications devices near the base station 80.

Step 304: Allocate remaining (n−g) wireless communications devices of the n wireless communications devices to the g coordinators to form g wireless communications groups according to the channel gains between remaining (n−g) wireless communications devices of the n wireless communications devices and the g coordinators.

Step 306: Reselect a coordinator from each of the g wireless communications groups having a maximum sum of channel gains with other wireless communications devices in the wireless communications group to generate g updated coordinators.

Step 308: Allocate remaining (n–g) wireless communications devices of the n wireless communications devices to the g updated coordinators to form g updated wireless communications groups. If the iteration of selecting g coordinators converges, go to Step 310; else go to Step 306.

Step 310: End.

In the first embodiment, after selecting g coordinators from n wireless communications devices near the base station 80, remaining (n–g) wireless communications devices of the n wireless communications devices can be allocated to the g coordinators to form g wireless communications groups according to the channel gain between remaining (n–g) wireless communications devices of the n wireless communications and g coordinators. In general, a shorter distance between a coordinator and a wireless communications device corresponds to a greater channel gain between the coordinator and the wireless communications device. After forming g wireless communications groups, reselecting a coordinator from each wireless communications group having a maximum sum of channel gains with other wireless communications devices in the wireless communications group. After performing step 308, repeat steps 306 and 308 for an amount of times, and then terminate the iteration of performing steps 306 and 308. At this time, use the lastly selected coordinators and wireless communications groups to perform transmission between wireless communications devices and the base station 80 to optimize the channel gains in the wireless communications groups and reduce power dissipation of the transmission between wireless communications devices and the base station 80. For example, a threshold can be set for determining whether the power dissipation of the transmission between wireless communications devices and the base station 80 is low enough. In this case, the iteration will terminate when the power dissipation of the transmission between wireless communications devices and the base station 80 is lower than the set threshold. Besides, the iteration can be terminated if the same g coordinators are repeatedly selected. In the first embodiment, when reselecting g coordinators, in order to minimize total power loss by maximizing channel gains, a small number of channel gains between certain wireless communications devices and coordinators may be large and undesirable. But overall channel gain is still optimized. Further, the sum of channel gains in step 306 can be replaced with the arithmetic mean of channel gains. The difference between the sum and the arithmetic mean is that the arithmetic mean of channel gains equals to the sum of channel gains divided by the number of wireless communications devices in a wireless communications group.

Figure 4:
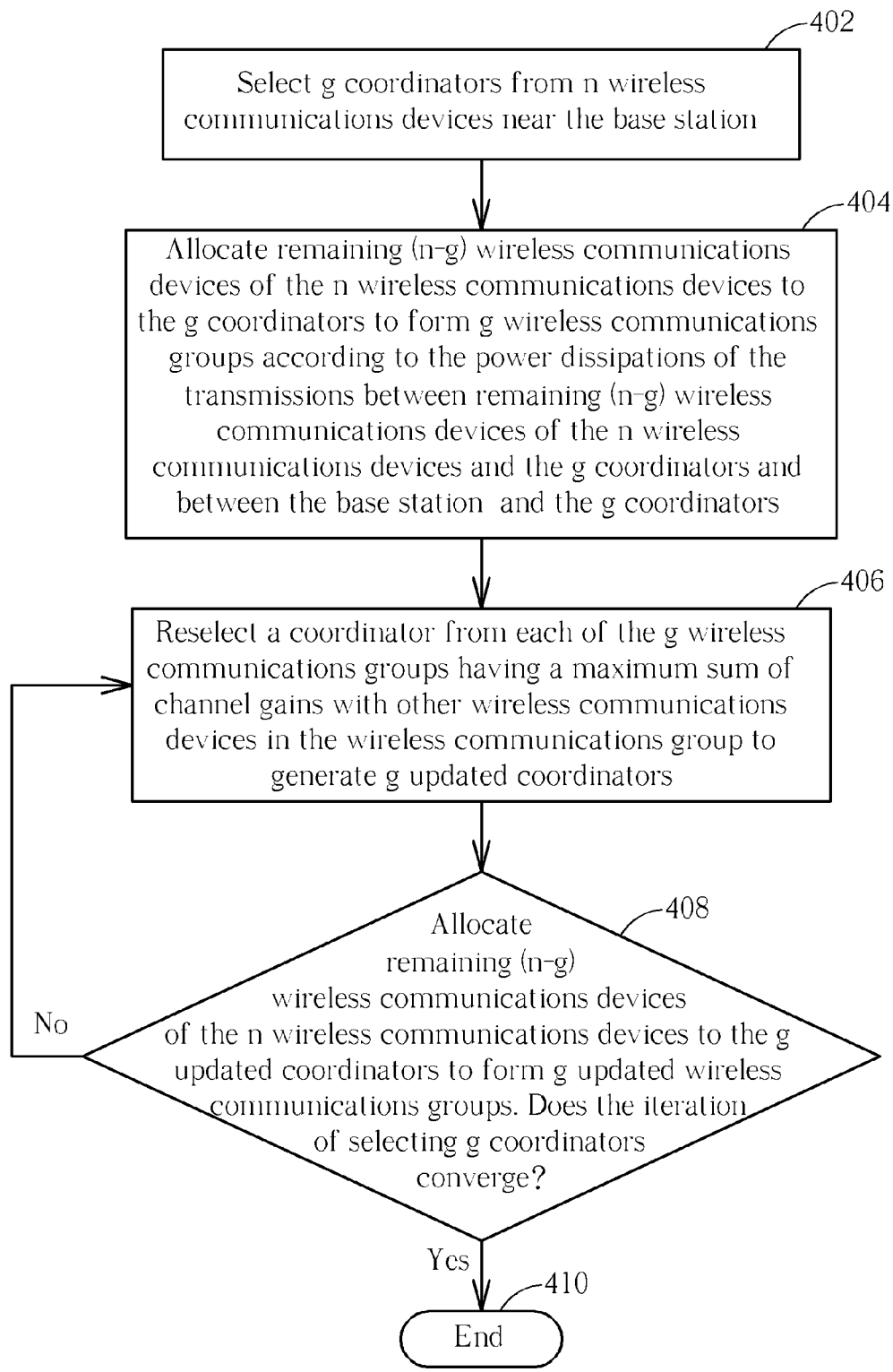
FIG. 4 is a flowchart showing forming wireless communications groups and reselecting coordinators in the wireless communications environment according to a second embodiment of the present invention.

Please refer to FIG. 4. FIG. 4 is a flowchart showing forming wireless communications groups and reselecting coordinators in the wireless communications environment 100 according to a second embodiment of the present invention. The flowchart is described as follows:

Step 402: Select g coordinators from n wireless communications devices near the base station 80.

Step 404: Allocate remaining (n–g) wireless communications devices of the n wireless communications devices to the g coordinators to form g wireless communications groups according to the power dissipations of the transmissions between remaining (n–g) wireless communications devices of the n wireless communications devices and the g coordinators and between the base station 80 and the g coordinators.

Step 406: Reselect a coordinator from each of the g wireless communications groups having a maximum sum of channel gains with other wireless communications devices in the wireless communications group to generate g updated coordinators.

Step 408: Allocate remaining (n–g) wireless communications devices of the n wireless communications devices to the g updated coordinators to form g updated wireless communications groups. If the iteration of selecting g coordinators converges, go to step 410; else go to step 406.

Step 410: End.

The difference between the second embodiment and the first embodiment is that in the second embodiment, allocating remaining (n–g) wireless communications devices of the n wireless communications devices to the g coordinators to form g wireless communications groups is according to the power dissipations of the transmissions between remaining (n–g) wireless communications devices of the n wireless communications devices and the g coordinators and between the base station 80 and the g coordinators. In other words, through performing step 404, a wireless communications device of remaining (n–g) wireless communications devices is allocated to a wireless communications group, and in this wireless communications group, the sum of the power dissipation of the transmission between the coordinator and this wireless communications device and the power dissipation of the transmission between the coordinator and the base station 80 will be smaller than if another wireless communications device is selected as a coordinator. Therefore, in the second embodiment, the total wireless transmission power dissipation of the transmission between a coordinator in each wireless communications group and the base station 80 can be reduced. Further, the sum of channel gains in step 406 can be replaced with the arithmetic mean of channel gains. The difference between the sum and the arithmetic mean is that the arithmetic mean of channel gains equals to the sum of channel gains divided by the number of the wireless communications devices in a wireless communications group.

Figure 5:
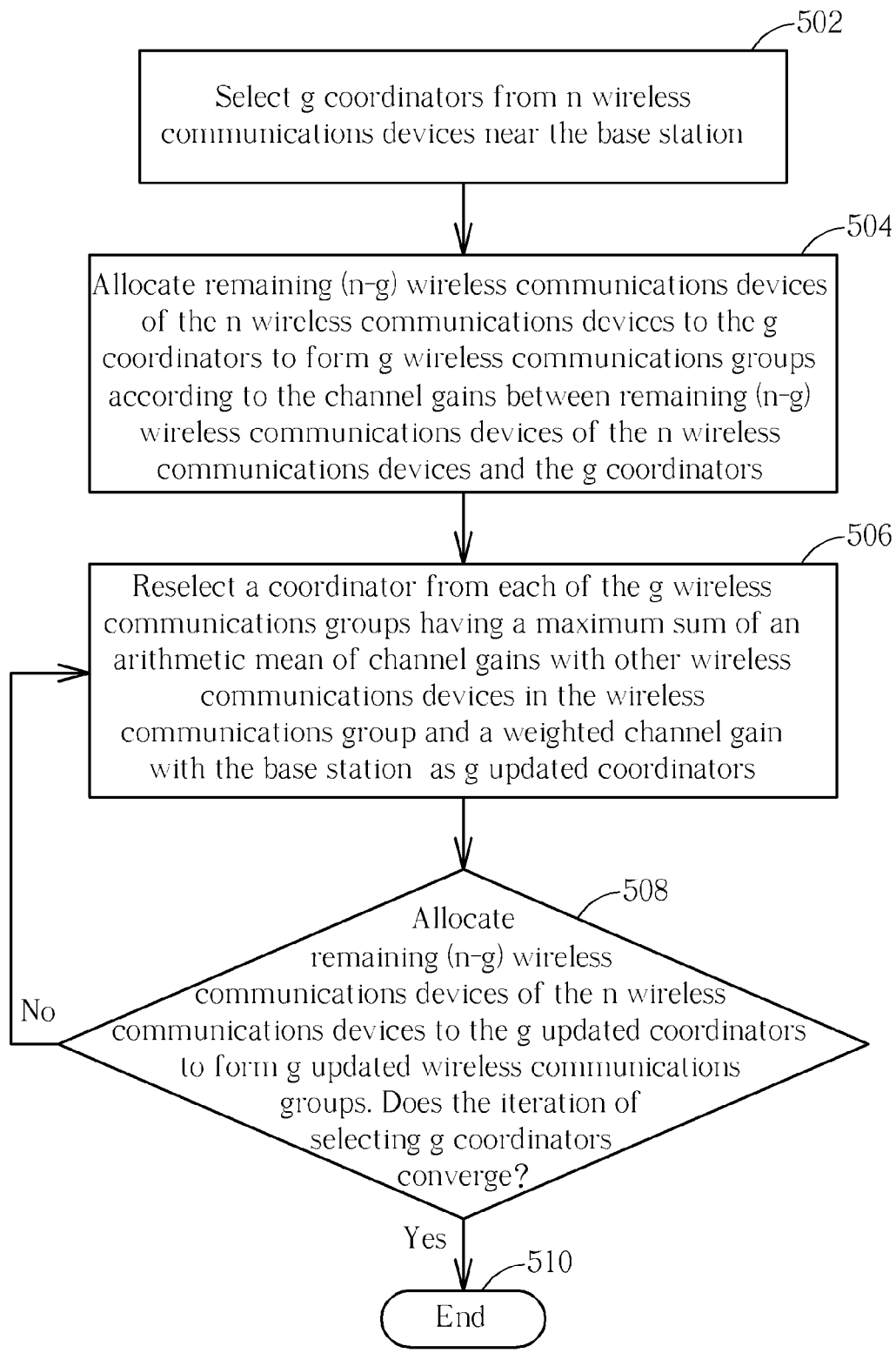
FIG. 5 is a flowchart showing forming wireless communications groups and reselecting coordinators in the wireless communications environment according to a third embodiment of the present invention.

Please refer to FIG. 5. FIG. 5 is a flowchart showing forming wireless communications groups and reselecting coordinators in the wireless communications environment 100 according to a third embodiment of the present invention. The flowchart is described as follows:

Step 502: Select g coordinators from n wireless communications devices near the base station 80.

Step 504: Allocate remaining (n–g) wireless communications devices of the n wireless communications devices to the g coordinators to form g wireless communications groups according to the channel gains between remaining (n–g) wireless communications devices of the n wireless communications devices and the g coordinators.

Step 506: Reselect a coordinator from each of the g wireless communications groups having a maximum sum of an arithmetic mean of channel gains with other wireless communications devices in the wireless communications group and a weighted channel gain with the base station 80 as g updated coordinators.

Step 508: Allocate remaining (n–g) wireless communications devices of the n wireless communications devices to the g updated coordinators to form g updated wireless communications groups. If the iteration of selecting g coordinators converges, go to step 510; else go to step 506.

Step 510: End.

The difference between the third embodiment and the first embodiment is that in the third embodiment, except considering reducing the power dissipation of the transmissions inside wireless communication groups, further considering reducing the power dissipation of the transmissions between the coordinators and the base station 80, thus reselecting a coordinator from each of the g wireless communications groups having a maximum sum of an arithmetic mean of channel gains with other wireless communications devices in the wireless communications group and a weighted channel gain with the base station 80 as g updated coordinators. Moreover, the sum of channel gains in step 506 can be replaced with the arithmetic mean of channel gains. The difference between the sum and the arithmetic mean is that the arithmetic mean of channel gains equals to the sum of channel gains divided by the number of the number of the wireless communications devices in a wireless communications group.

Figure 6:
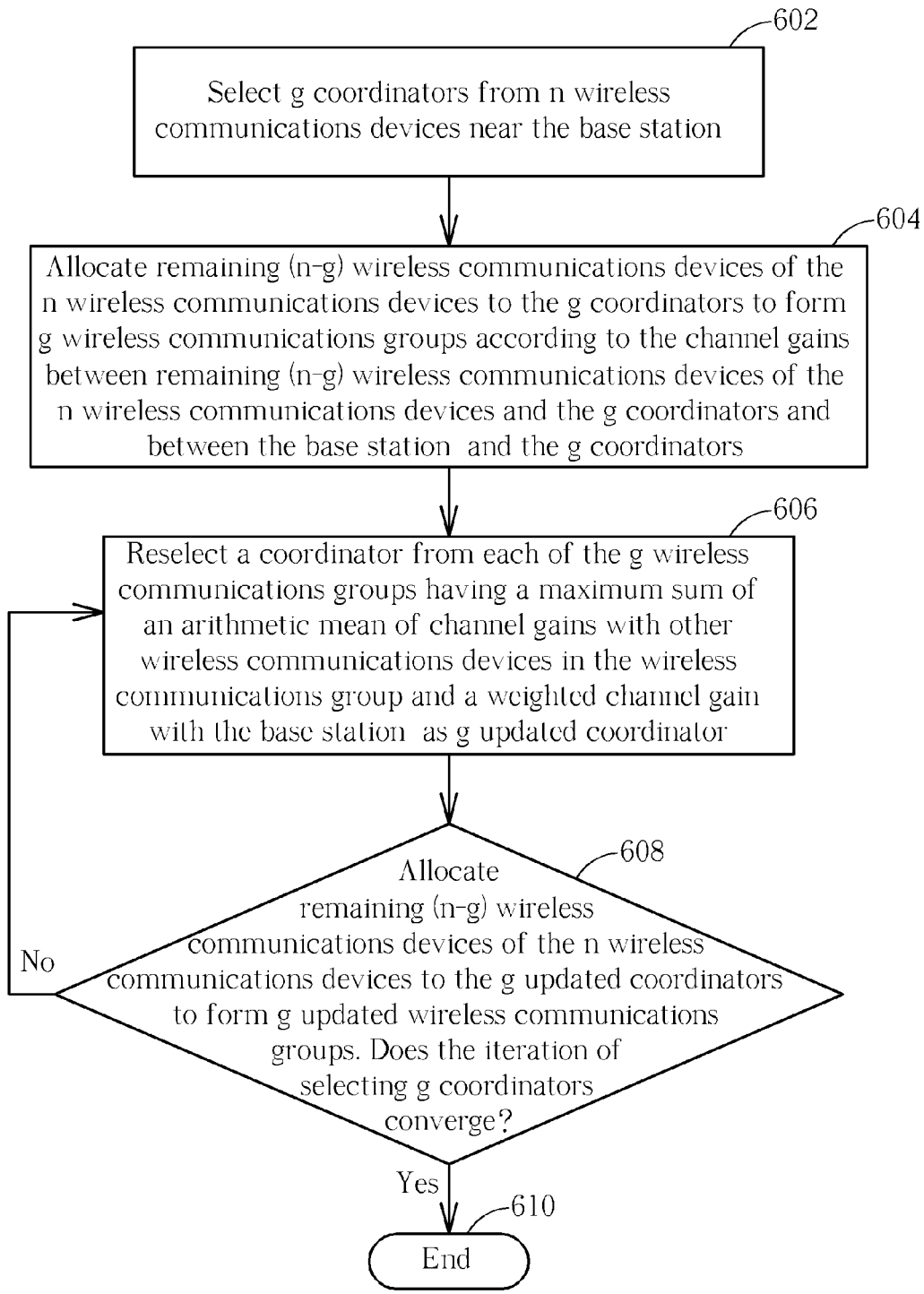
FIG. 6 is a flowchart showing forming wireless communications groups and reselecting coordinators in the wireless communications environment according to a fourth embodiment of the present invention.

Please refer to FIG. 6. FIG. 6 is a flowchart showing forming wireless communications groups and reselecting coordinators in the wireless communications environment 100 according to a fourth embodiment of the present invention. The flowchart is described as follows:

Step 602: Select g coordinators from n wireless communications devices near the base station 80.

Step 604: Allocate remaining (n–g) wireless communications devices of the n wireless communications devices to the g coordinators to form g wireless communications groups according to the channel gains between remaining (n–g) wireless communications devices of the n wireless communications devices and the g coordinators and between the base station 80 and the g coordinators.

Step 606: Reselect a coordinator from each of the g wireless communications groups having a maximum sum of an arithmetic mean of channel gains with other wireless communications devices in the wireless communications group and a weighted channel gain with the base station 80 as g updated coordinators.

Step 608: Allocate remaining (n–g) wireless communications devices of the n wireless communications devices to the g updated coordinators to form g updated wireless communications groups. If the iteration of selecting g coordinators converges, go to step 610; else go to step 606.

Step 610: End.

The difference between the fourth embodiment and the second embodiment is that in the fourth embodiment, except considering reducing the power dissipation of the transmissions inside wireless communication groups, further considering reducing the power dissipation of the transmissions between the coordinators and the base station 80, thus reselecting a coordinator from each of the g wireless communications groups having a maximum sum of an arithmetic mean of channel gains with other wireless communications devices in the wireless communications group and a weighted channel gain with the base station 80 as g updated coordinators. Moreover, the sum of channel gains in step 606 can be replaced with the arithmetic mean of channel gains. The difference between the sum and the arithmetic mean is that the arithmetic mean of channel gains equals to the sum of channel gains divided by 1 fewer than the number of wireless communications devices in a wireless communications group.

Figure 7:
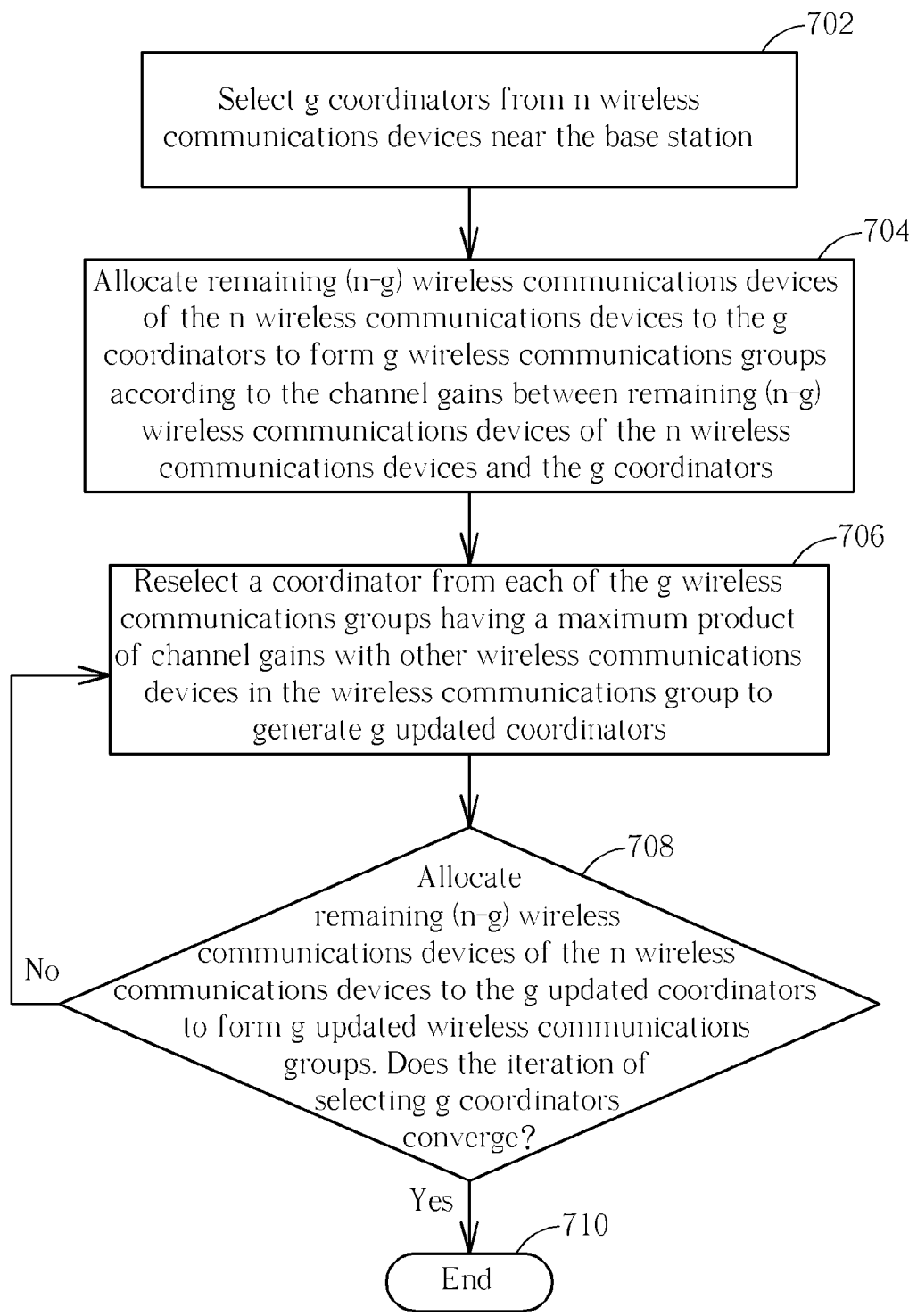
FIG. 7 is a flowchart showing forming wireless communications groups and reselecting coordinators in the wireless communications environment according to a fifth embodiment of the present invention.

Please refer to FIG. 7. FIG. 7 is a flowchart showing forming wireless communications groups and reselecting coordinators in the wireless communications environment 100 according to a fifth embodiment of the present invention. The flowchart is described as follows:

Step 702: Select g coordinators from n wireless communications devices near the base station 80.

Step 704: Allocate remaining (n–g) wireless communications devices of the n wireless communications devices to the g coordinators to form g wireless communications groups according to the channel gains between remaining (n–g) wireless communications devices of the n wireless communications devices and the g coordinators.

Step 706: Reselect a coordinator from each of the g wireless communications groups having a maximum product of channel gains with other wireless communications devices in the wireless communications group to generate g updated coordinators.

Step 708: Allocate remaining (n–g) wireless communications devices of the n wireless communications devices to the g updated coordinators to form g updated wireless communications groups. If the iteration of selecting g coordinators converges, go to step 710; else go to step 706.

Step 710: End.

The difference between the fifth embodiment and the first embodiment is that in the fifth embodiment, channel gains of each wireless communications device in a wireless communications group is considered, that is, in a wireless communications group, the channel gains of a minority of wireless communications devices will not be ignored for a majority of the wireless communications devices to reach high channel gains. Thus, through reselecting a coordinator from each of the g wireless communications groups having a maximum product of channel gains with other wireless communications devices in the wireless communications group to generate g updated coordinators, the situation that the channel gains of a minority of wireless communications devices not being considered can be avoided. Further, the product of channel gains in step 706 can be replaced with the geometric mean of channel gains. The difference between the product and geometric mean is that the product of channel gains equals to the geometric mean of channel gains to the power of 1 fewer than the number of the wireless communications devices in a wireless communications group.

Figure 8:
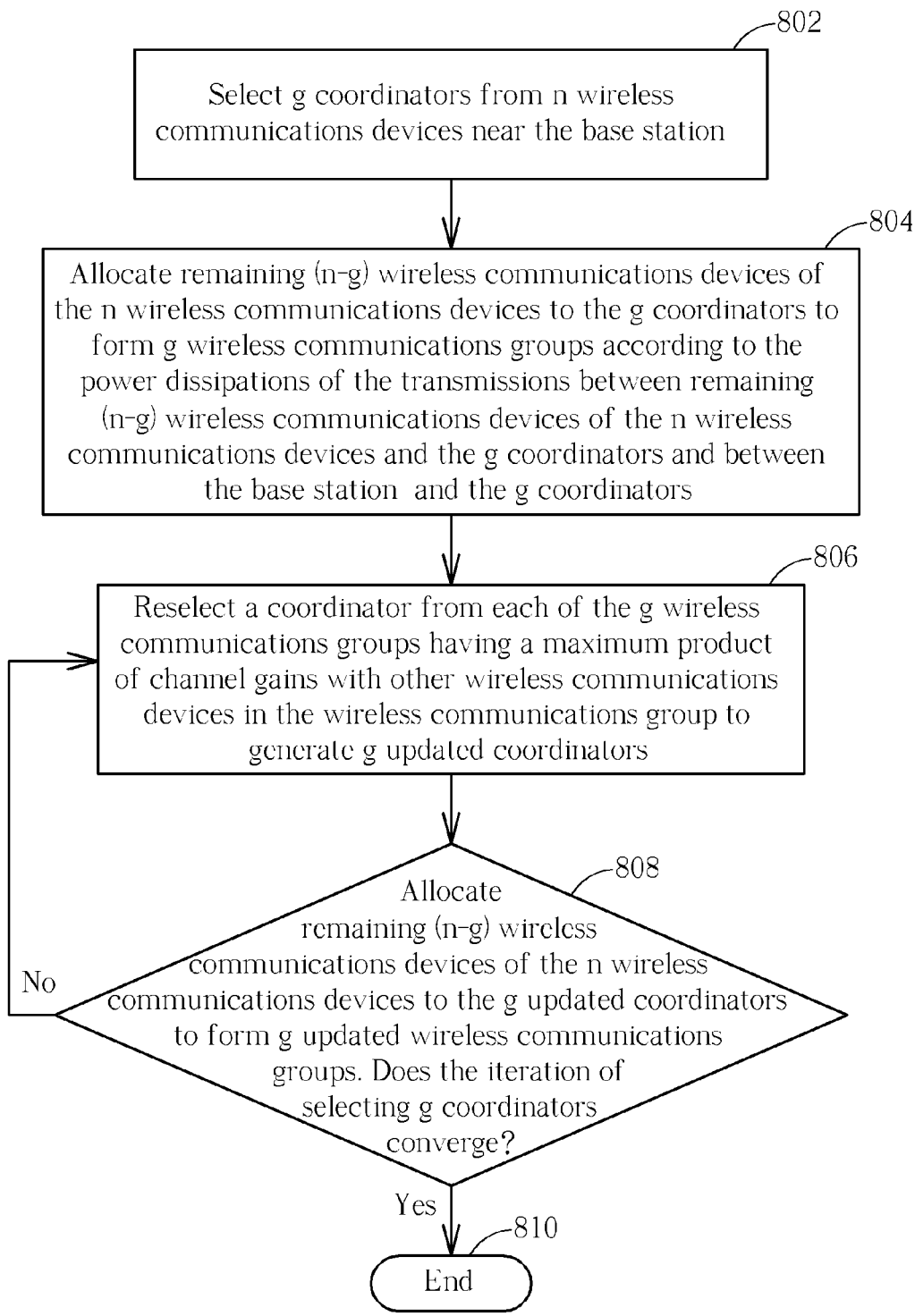
FIG. 8 is a flowchart showing forming wireless communications groups and reselecting coordinators in the wireless communications environment according to a sixth embodiment of the present invention.

Please refer to FIG. 8. FIG. 8 is a flowchart showing forming wireless communications groups and reselecting coordinators in the wireless communications environment 100 according to a sixth embodiment of the present invention. The flowchart is described as follows:

Step 802: select g coordinators from n wireless communications devices near the base station 80.

Step 804: Allocate remaining (n–g) wireless communications devices of the n wireless communications devices to the g coordinators to form g wireless communications groups according to the power dissipations of the transmissions between remaining (n–g) wireless communications devices of the n wireless communications devices and the g coordinators and between the base station 80 and the g coordinators.

Step 806: Reselect a coordinator from each of the g wireless communications groups having a maximum product of channel gains with other wireless communications devices in the wireless communications group to generate g updated coordinators.

Step 808: Allocate remaining (n–g) wireless communications devices of the n wireless communications devices to the g updated coordinators to form g updated wireless communications groups. If the iteration of selecting g coordinators converges, go to step 810; else go to step 806.

Step 810: End.

The difference between the fifth embodiment and the first embodiment is that in the fifth embodiment, channel gains of each wireless communications device in a wireless communications group is taken into consideration, that is, in a wireless communications group, the channel gains of a minority of wireless communications devices will not be ignored for a majority of the wireless communications devices to reach high channel gains. Thus, through reselecting a coordinator from each of the g wireless communications groups having a maximum product of channel gains with other wireless communications devices in the wireless communications group to generate g updated coordinators, the situation that the channel gains of a minority of wireless communications devices not being considered can be avoided. Further, the product of channel gains in step 806 can be replaced with the geometric mean of channel gains. The difference between the product and the geometric mean is that the product of channel gains equals to the geometric mean of channel gains to the power of 1 fewer than the number of the wireless communications devices.

Figure 9:
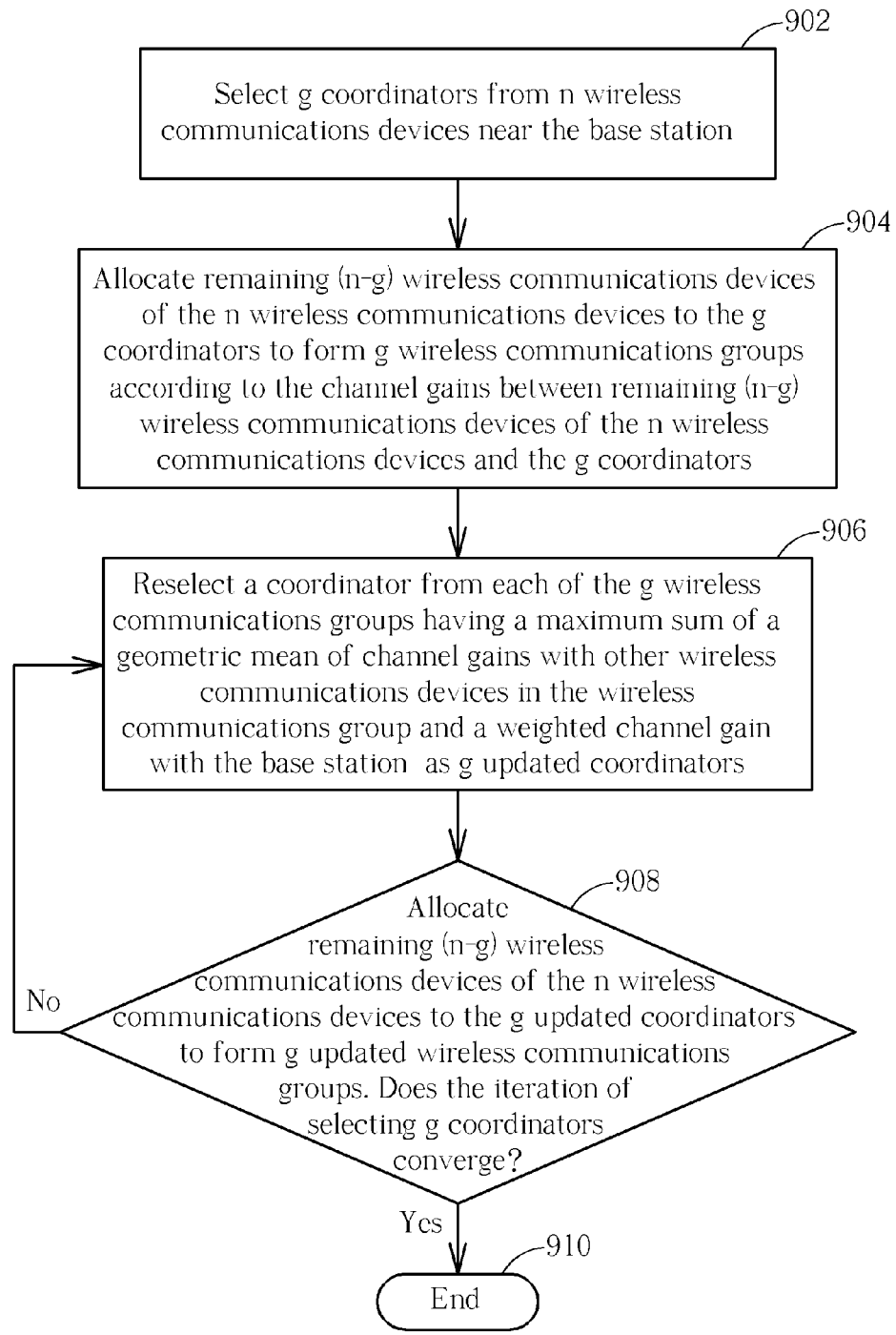
FIG. 9 is a flowchart showing forming wireless communications groups and reselecting coordinators in the wireless communications environment according to a seventh embodiment of the present invention.

Please refer to FIG. 9. FIG. 9 is a flowchart showing forming wireless communications groups and reselecting coordinators in the wireless communications environment 100 according to a seventh embodiment of the present invention. The flowchart is described as follows:

Step 902: Select g coordinators from n wireless communications devices near the base station 80.

Step 904: Allocate remaining (n–g) wireless communications devices of the n wireless communications devices to the g coordinators to form g wireless communications groups according to the channel gains between remaining (n–g) wireless communications devices of the n wireless communications devices and the g coordinators.

Step 906: Reselect a coordinator from each of the g wireless communications groups having a maximum sum of a geometric mean of channel gains with other wireless communications devices in the wireless communications group and a weighted channel gain with the base station 80 as g updated coordinators.

Step 908: Allocate remaining (n–g) wireless communications devices of the n wireless communications devices to the g updated coordinators to form g updated wireless communications groups. If the iteration of selecting g coordinators converges, go to step 910; else go to step 906.

Step 910: End.

The difference between the seventh embodiment and the fifth embodiment is that in the seventh embodiment, when reselecting a coordinator from each of the g wireless communications groups to generate g updated coordinators, except considering channel gains between each wireless communications device and the coordinator, further considering the channel gain between the base station 80 and the coordinator, thus reselecting a coordinator from each of the g wireless communications groups having a maximum sum of a geometric mean of channel gains with other wireless communications devices in the wireless communications group and a weighted channel gain with the base station 80 as g updated coordinators. Moreover, the product of channel gains in step 906 can be replaced with the geometric mean of channel gains. The difference between the product and geometric mean is that the product of channel gains equals to the geometric mean of channel gains to the power of 1 fewer than the number of the wireless communications devices in a wireless communications group.

Figure 10:
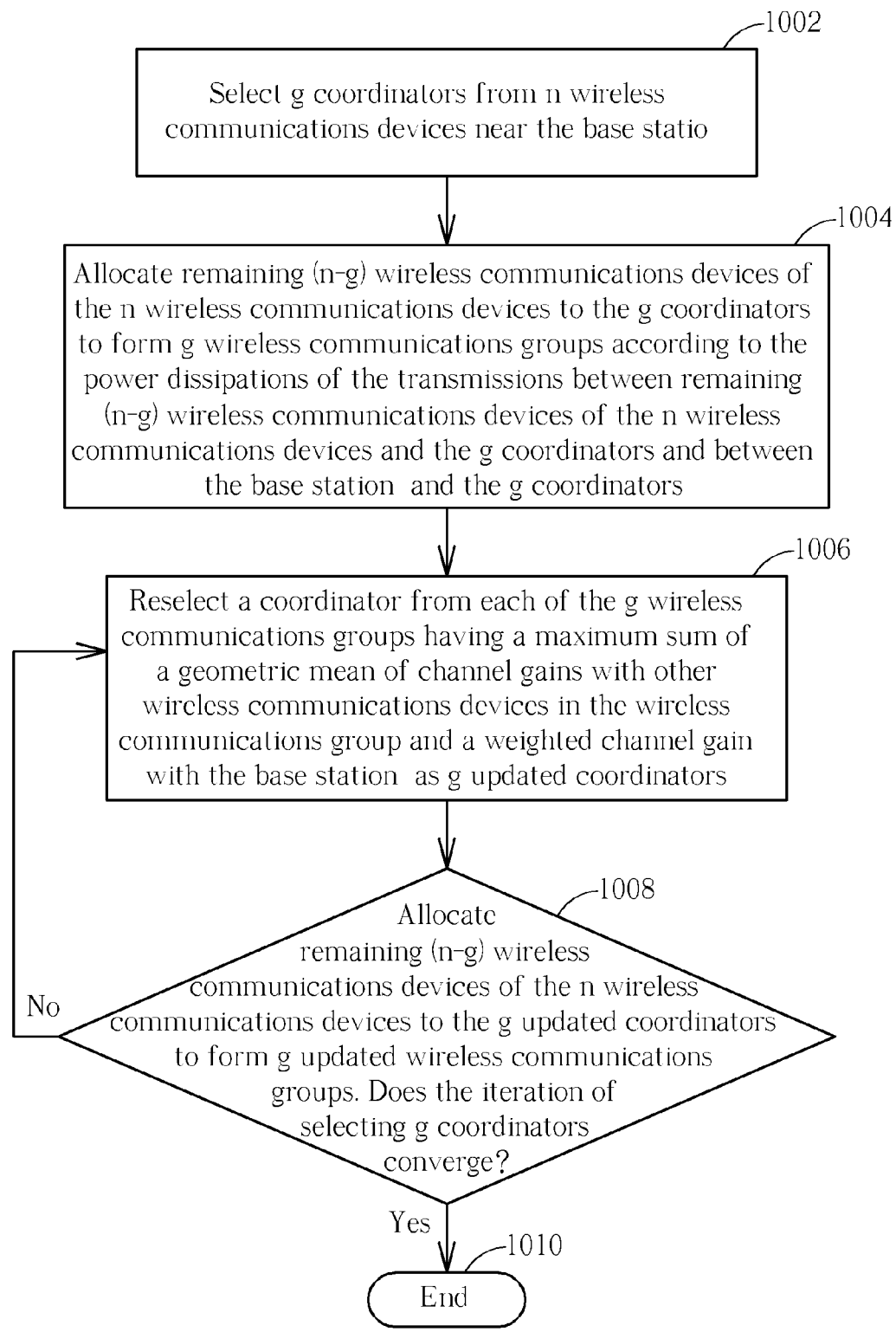
FIG. 10 is a flowchart showing forming wireless communications groups and reselecting coordinators in the wireless communications environment according to an eighth embodiment of the present invention.

Please refer to FIG. 10. FIG. 10 is a flowchart showing forming wireless communications groups and reselecting coordinators in the wireless communications environment 100 according to an eighth embodiment of the present invention. The flowchart is described as follows:

Step 1002: Select g coordinators from n wireless communications devices near the base station 80.

Step 1004: Allocate remaining (n–g) wireless communications devices of the n wireless communications devices to the g coordinators to form g wireless communications groups according to the power dissipations of the transmissions between remaining (n–g) wireless communications devices of the n wireless communications devices and the g coordinators and between the base station 80 and the g coordinators.

Step 1006: Reselect a coordinator from each of the g wireless communications groups having a maximum sum of a geometric mean of channel gains with other wireless communications devices in the wireless communications group and a weighted channel gain with the base station 80 as g updated coordinators.

Step 1008: Allocate remaining (n–g) wireless communications devices of the n wireless communications devices to the g updated coordinators to form g updated wireless communications groups. If the iteration of selecting g coordinators converges, go to step 1010; else go to step 1006.

Step 1010: End.

The difference between the eighth embodiment and the sixth embodiment is that in the eighth embodiment, when reselecting a coordinator from each of the g wireless communications groups to generate g updated coordinators, except considering channel gains between each wireless communications device and the coordinator, further considering the channel gain between the base station 80 and the coordinator, thus reselecting a coordinator from each of the g wireless communications groups having a maximum sum of a geometric mean of channel gains with other wireless communications devices in the wireless communications group and a weighted channel gain with the base station 80 as g updated coordinators. Moreover, the product of channel gains in step 1006 can be replaced with the geometric mean of channel gains. The difference between the product and geometric mean is that the product of channel gains equals to the geometric mean of channel gains to the power of 1 fewer than the number of the wireless communications devices in a wireless communications group.

Figure 11:
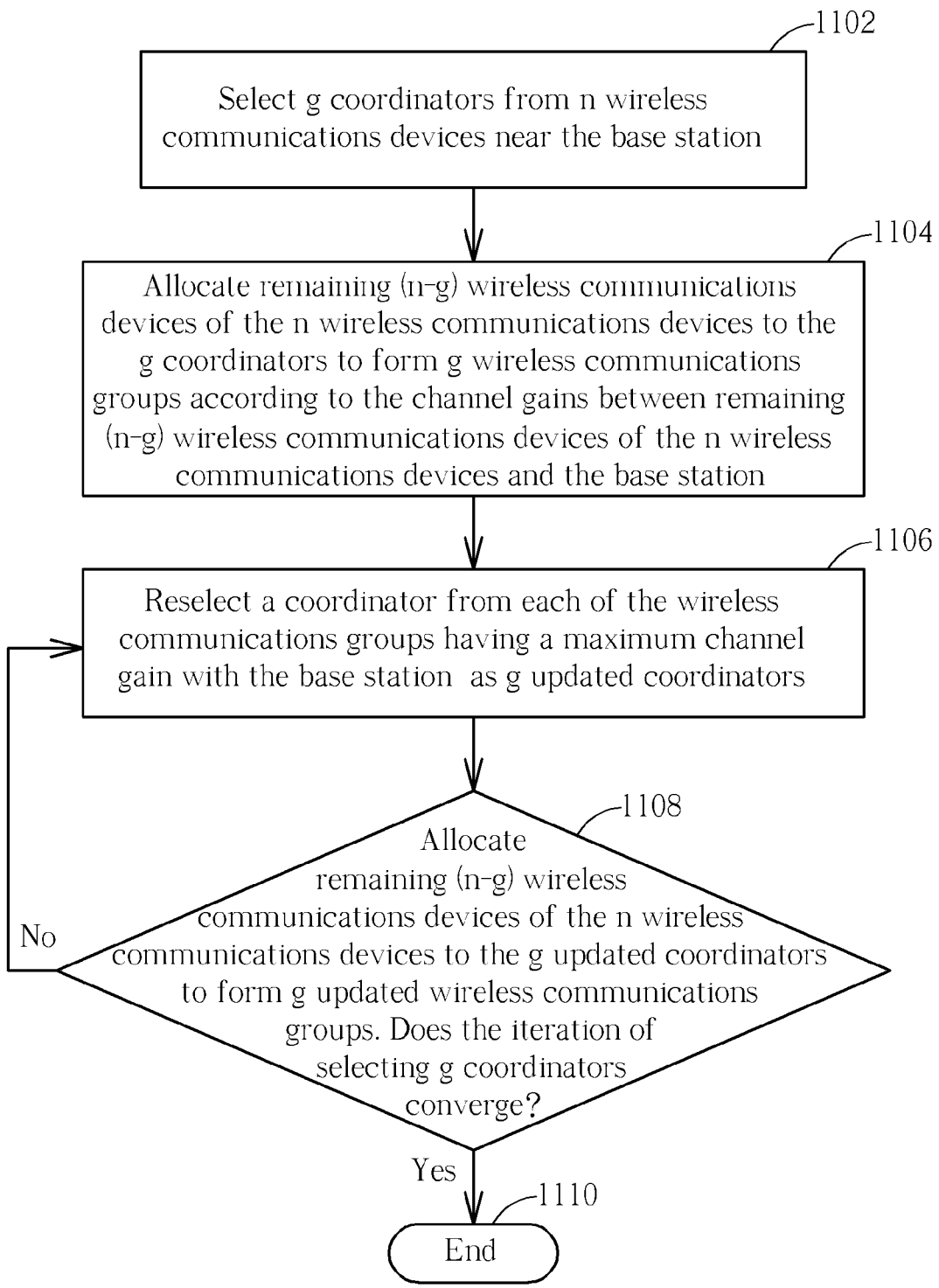
FIG. 11 is a flowchart showing forming wireless communications groups and reselecting coordinators in the wireless communications environment according to a ninth embodiment of the present invention.

Please refer to FIG. 11. FIG. 11 is a flowchart showing forming wireless communications groups and reselecting coordinators in the wireless communications environment 100 according to a ninth embodiment of the present invention. The flowchart is described as follows:

Step 1102: Select g coordinators from n wireless communications devices near the base station 80.

Step 1104: Allocate remaining (n–g) wireless communications devices of the n wireless communications devices to the g coordinators to form g wireless communications groups according to the channel gains between remaining (n–g) wireless communications devices of the n wireless communications devices and the base station 80.

Step 1106: Reselect a coordinator from each of the wireless communications groups having a maximum channel gain with the base station 80 as g updated coordinators.

Step 1108: Allocate remaining (n–g) wireless communications devices of the n wireless communications devices to the g updated coordinators to form g updated wireless communications groups. If the iteration of selecting g coordinators converges, go to step 1110; else go to step 1106.

Step 1110: End.

The difference between the ninth embodiment and the first embodiment is that in the ninth embodiment, when reselecting a coordinator from each of the g wireless communications groups to generate g updated coordinators, because considering reducing the power dissipation of the transmission between the coordinator and the base station 80, a coordinator having a maximum channel gain with the base station 80 is selected from each of the wireless communications groups to generate g updated coordinators.

Figure 12:
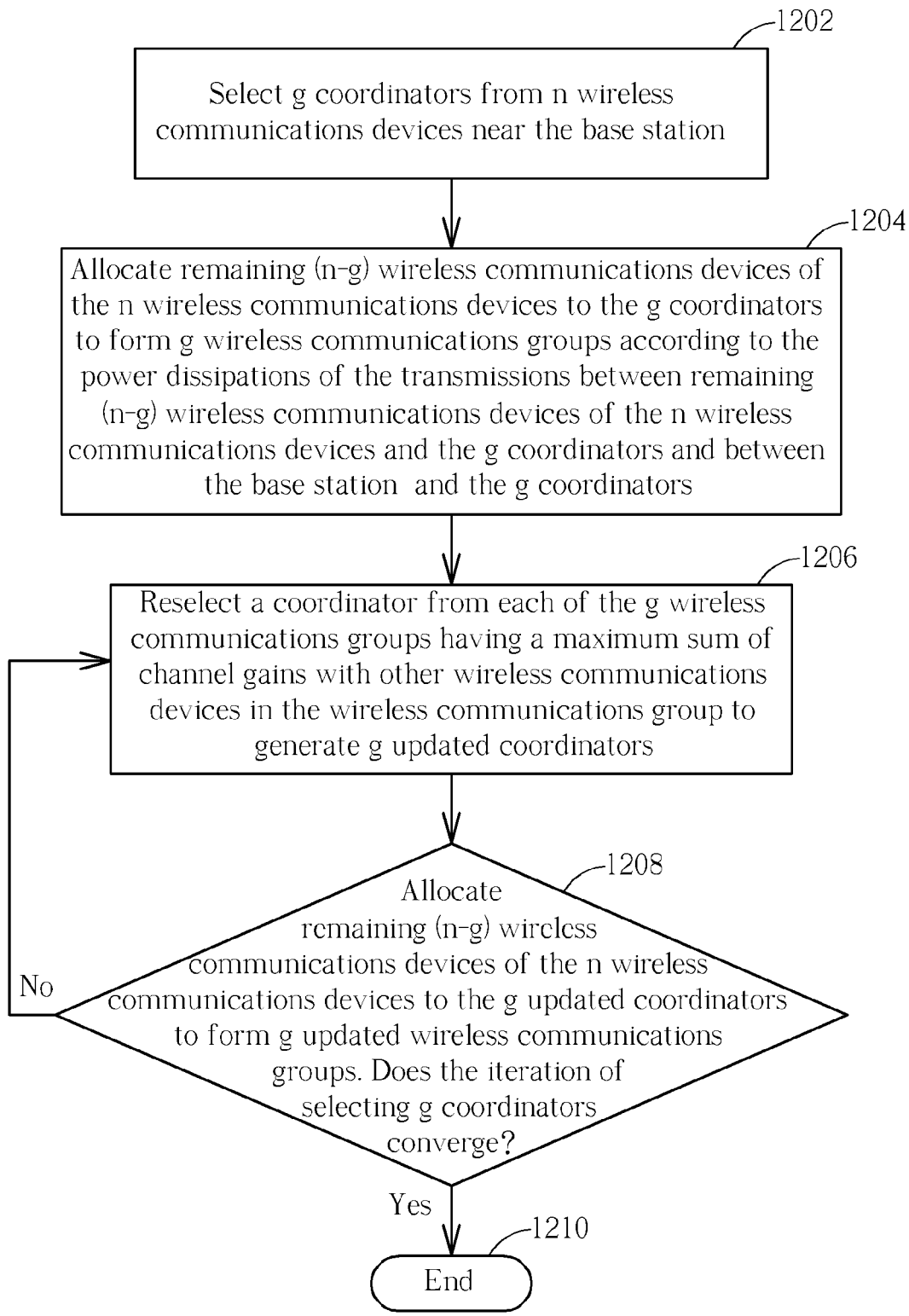
FIG. 12 is a flowchart showing forming wireless communications groups and reselecting coordinators in the wireless communications environment according to a tenth embodiment of the present invention.

Please refer to FIG. 12. FIG. 12 is a flowchart showing forming wireless communications groups and reselecting coordinators in the wireless communications environment 100 according to a tenth embodiment of the present invention. The flowchart is described as follows:

Step 1202: Select g coordinators from n wireless communications devices near the base station 80.

Step 1204: Allocate remaining (n–g) wireless communications devices of the n wireless communications devices to the g coordinators to form g wireless communications groups according to the power dissipations of the transmissions between remaining (n–g) wireless communications devices of the n wireless communications devices and the g coordinators and between the base station 80 and the g coordinators.

Step 1206: Reselect a coordinator from each of the g wireless communications groups having a maximum sum of channel gains with other wireless communications devices in the wireless communications group to generate g updated coordinators.

Step 1208: Allocate remaining (n–g) wireless communications devices of the n wireless communications devices to the g updated coordinators to form g updated wireless communications groups. If the iteration of selecting g coordinators converges, perform step 1210; else go to step 1206.

Step 1210: End.

The difference between the tenth embodiment and second embodiment is that in the tenth embodiment, when reselecting a coordinator from each of the g wireless communications groups to generate g updated coordinators, because considering reducing the power dissipation of the transmission between the coordinator and the base station 80, a coordinator having a maximum channel gain with the base station 80 is selected from each of the wireless communications groups to generate g updated coordinators.

Figure 13:
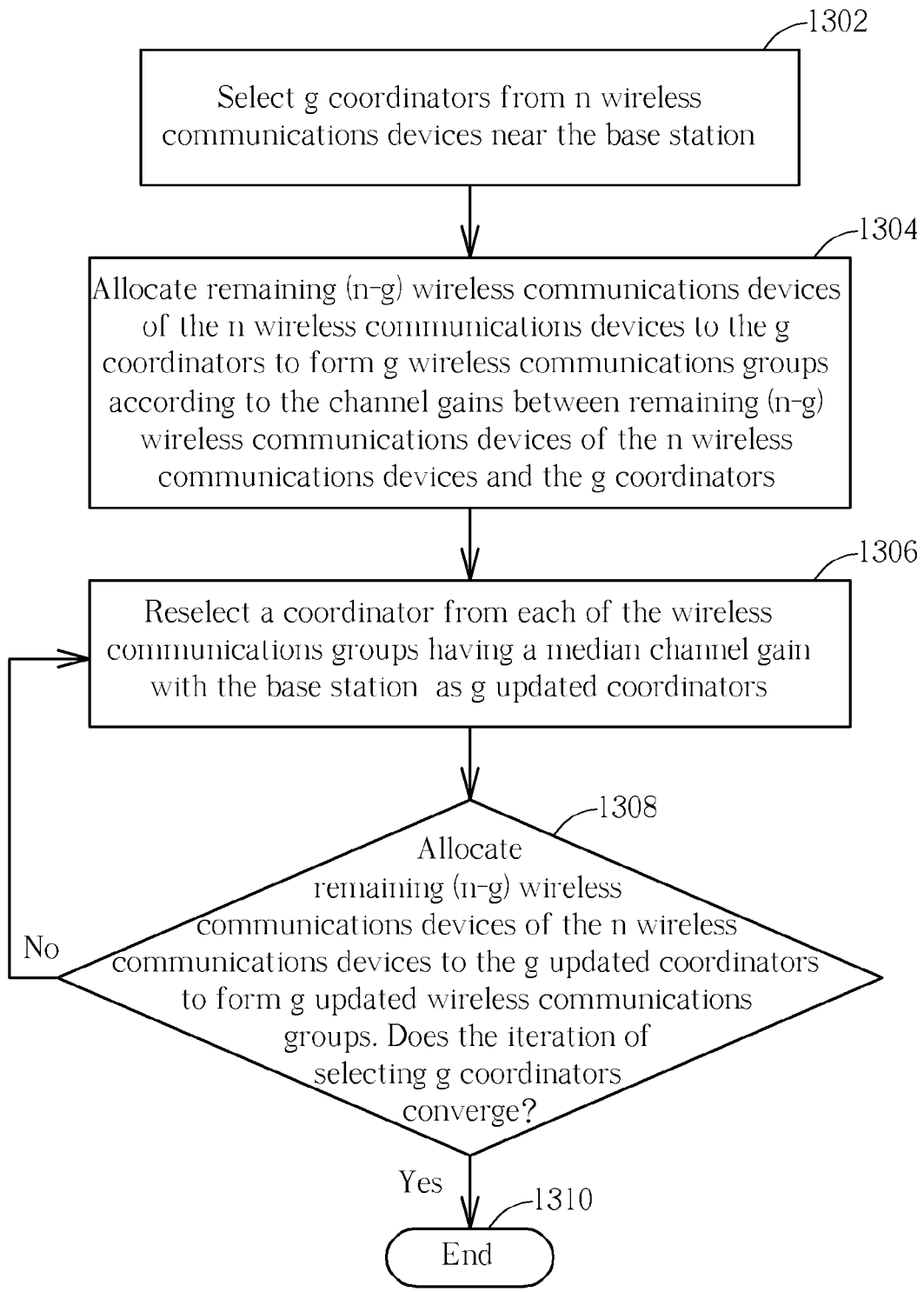
FIG. 13 is a flowchart showing forming wireless communications groups and reselecting coordinators in the wireless communications environment according to an eleventh embodiment of the present invention.

Please refer to FIG. 13. FIG. 13 is a flowchart showing forming wireless communications groups and reselecting coordinators in the wireless communications environment 100 according to an eleventh embodiment of the present invention. The flowchart is described as follows:

Step 1302: Select g coordinators from n wireless communications devices near the base station 80.

Step 1304: Allocate remaining (n–g) wireless communications devices of the n wireless communications devices to the g coordinators to form g wireless communications groups according to the channel gains between remaining (n–g) wireless communications devices of the n wireless communications devices and the g coordinators.

Step 1306: Reselect a coordinator from each of the wireless communications groups having a median channel gain with the base station 80 as g updated coordinators.

Step 1308: Allocate remaining (n–g) wireless communications devices of the n wireless communications devices to the g updated coordinators to form g updated wireless communications groups. If the iteration of selecting g coordinators converges, perform step 1310; else go to step 1306.

Step 1310: End.

The difference between the eleventh embodiment and the first embodiment is that in the eleventh embodiment, when reselecting a coordinator from each of the g wireless communications groups to generate g updated coordinators, because considering reducing the power dissipation of the transmission between the coordinator and the base station 80 as well as considering reducing the power dissipation of the transmission inside the wireless communications groups, a coordinator having a median channel gain with the base station 80 is selected from each of the wireless communications groups to generate g updated coordinators.

Figure 14:
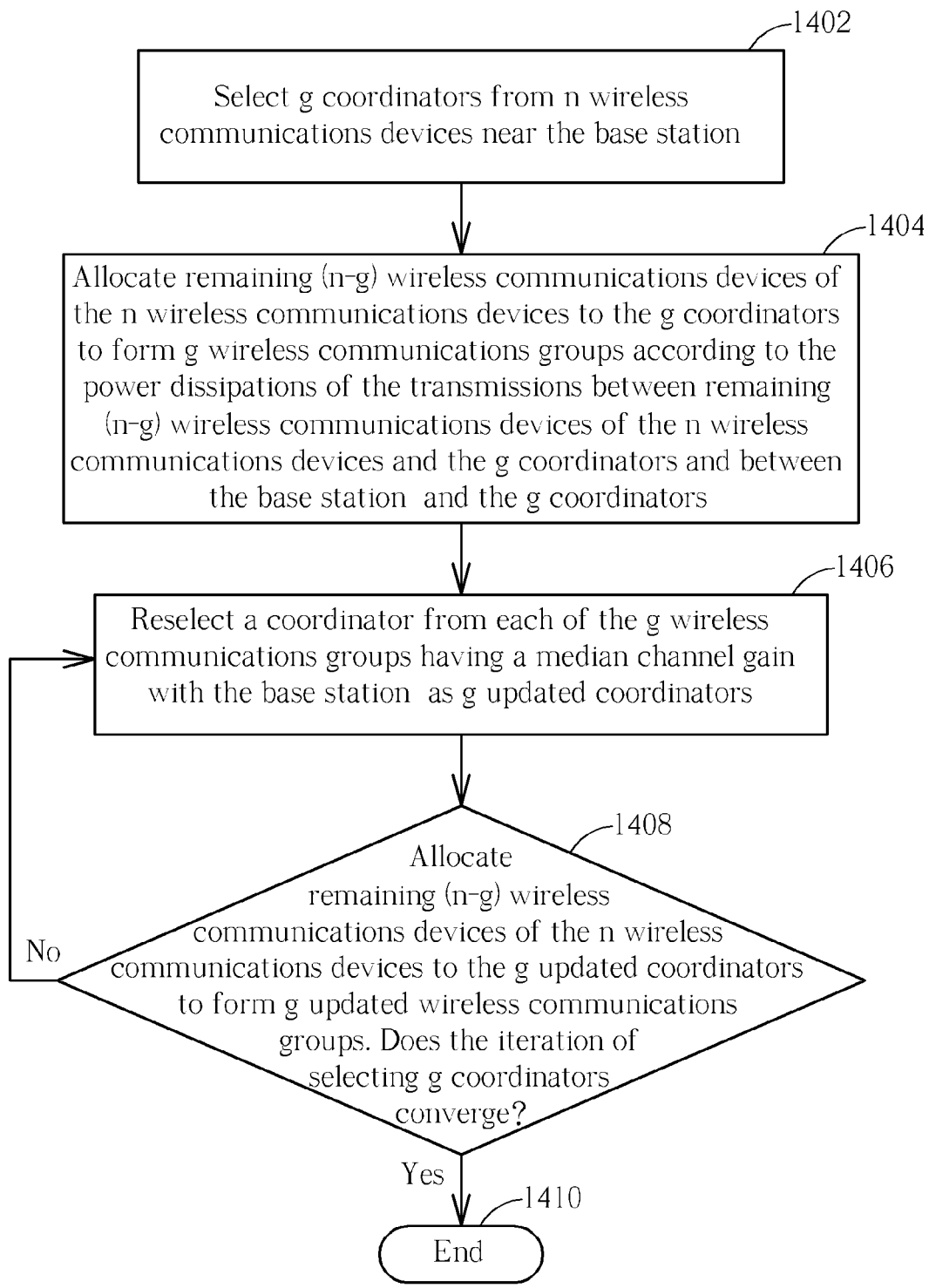
FIG. 14 is a flowchart showing forming wireless communications groups and reselecting coordinators in the wireless communications environment according to a twelfth embodiment of the present invention.

Please refer to FIG. FIG. 14 is a flowchart showing forming wireless communications groups and reselecting coordinators in the wireless communications environment 100 according to a twelfth embodiment of the present invention. The flowchart is described as follows:

Step 1402: Select g coordinators from n wireless communications devices near the base station 80.

Step 1404: Allocate remaining (n–g) wireless communications devices of the n wireless communications devices to the g coordinators to form g wireless communications groups according to the power dissipations of the transmissions between remaining (n–g) wireless communications devices of the n wireless communications devices and the g coordinators and between the base station 80 and the g coordinators.

Step 1406: Reselect a coordinator from each of the g wireless communications groups having a median channel gain with the base station 80 as g updated coordinators.

Step 1408: Allocate remaining (n–g) wireless communications devices of the n wireless communications devices to the g updated coordinators to form g updated wireless communications groups. If the iteration of selecting g coordinators converges, perform step 1410; else go to step 1406.

Step 1410: End.

The difference between the twelfth embodiment and the second embodiment is that in the twelfth embodiment, when reselecting a coordinator from each of the g wireless communications groups to generate g updated coordinators, because considering reducing the power dissipation of the transmission between the coordinator and the base station 80 as well as considering reducing the power dissipation of the transmission inside the wireless communications groups, a coordinator having a median channel gain with the base station 80 is selected from each of the wireless communications groups to generate g updated coordinators.

Figure 15:
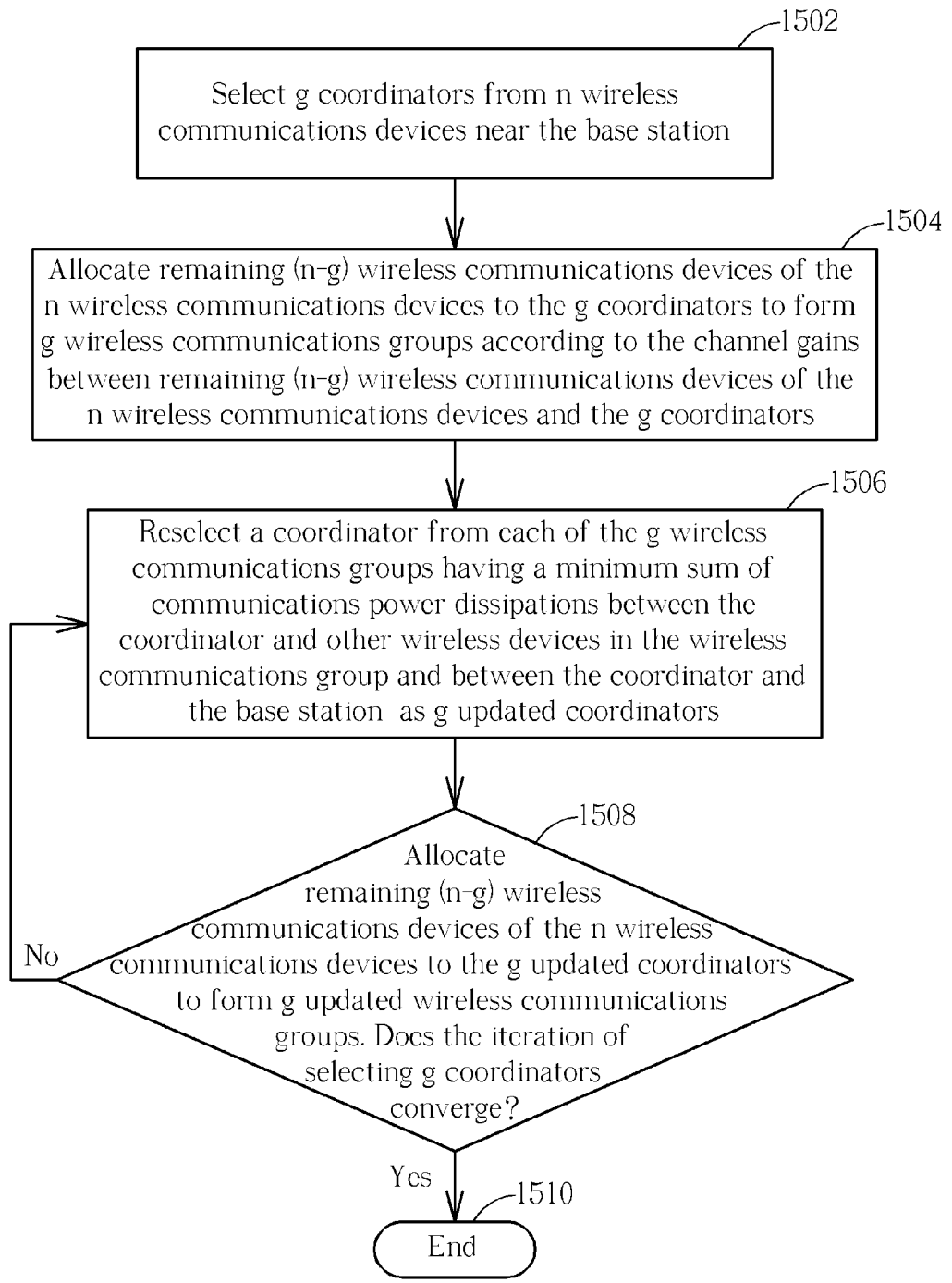
FIG. 15 is a flowchart showing forming wireless communications groups and reselecting coordinators in the wireless communications environment according to a thirteen embodiment of the present invention.

Please refer to FIG. 15. FIG. 15 is a flowchart showing forming wireless communications groups and reselecting coordinators in the wireless communications environment 100 according to a thirteen embodiment of the present invention. The flowchart is described as follows:

Step 1502: Select g coordinators from n wireless communications devices near the base station 80.

Step 1504: Allocate remaining (n–g) wireless communications devices of the n wireless communications devices to the g coordinators to form g wireless communications groups according to the channel gains between remaining (n–g) wireless communications devices of the n wireless communications devices and the g coordinators.

Step 1506: Reselect a coordinator from each of the g wireless communications groups having a minimum sum of communications power dissipations between the coordinator and other wireless devices in the wireless communications group and between the coordinator and the base station 80 as g updated coordinators.

Step 1508: Allocate remaining (n–g) wireless communications devices of the n wireless communications devices to the g updated coordinators to form g updated wireless communications groups. If the iteration of selecting g coordinators converges, perform step 1510, and if the iteration of selecting g coordinators does not converge; else go to step 1506.

Step 1510: End.

The difference between the thirteen embodiment and the first embodiment is that in the thirteen embodiment, when reselecting a coordinator from each of the g wireless communications groups to generate g updated coordinators, because considering reducing the power dissipation of the transmission between the coordinator and the base station 80 as well as considering reducing the power dissipation of the transmission inside the wireless communications groups, a coordinator having a minimum sum of communications power dissipations between the coordinator and other wireless devices in the wireless communications group and between the coordinator and the base station 80 is selected from each of the wireless communications groups to generate g updated coordinators.

Figure 16:
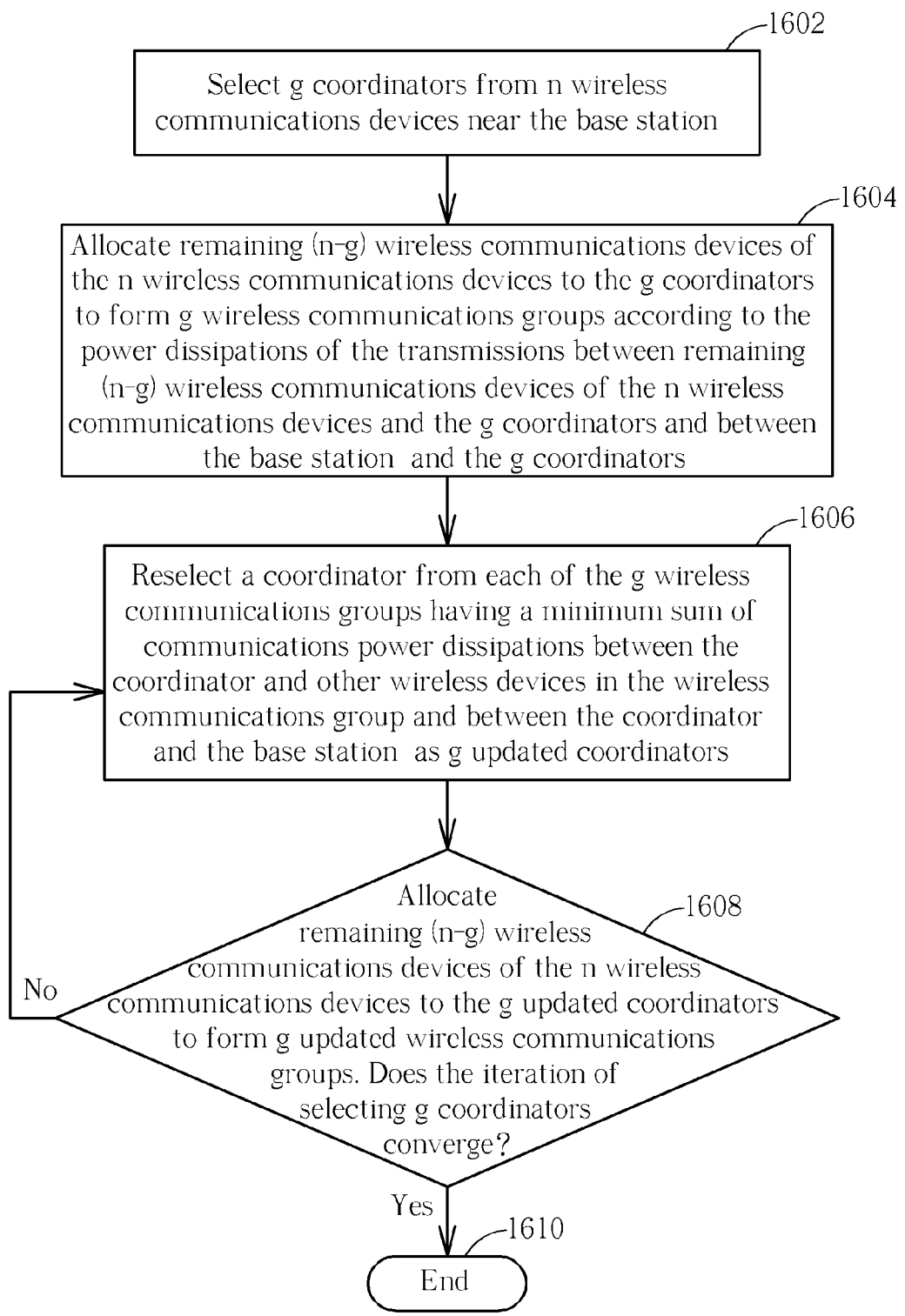
FIG. 16 is a flowchart showing forming wireless communications groups and reselecting coordinators in the wireless communications environment according to a fourteen embodiment of the present invention.

Please refer to FIG. 16. FIG. 16 is a flowchart showing forming wireless communications groups and reselecting coordinators in the wireless communications environment 100 according to a fourteen embodiment of the present invention. The flowchart is described as follows:

Step 1602: Select g coordinators from n wireless communications devices near the base station 80.

Step 1604: Allocate remaining (n−g) wireless communications devices of the n wireless communications devices to the g coordinators to form g wireless communications groups according to the power dissipations of the transmissions between remaining (n−g) wireless communications devices of the n wireless communications devices and the g coordinators and between the base station 80 and the g coordinators.

Step 1606: Reselect a coordinator from each of the g wireless communications groups having a minimum sum of communications power dissipations between the coordinator and other wireless devices in the wireless communications group and between the coordinator and the base station 80 as g updated coordinators.

Step 1608: Allocate remaining (n−g) wireless communications devices of the n wireless communications devices to the g updated coordinators to form g updated wireless communications groups. If the iteration of selecting g coordinators converges, perform step 1610, and if the iteration of selecting g coordinators does not converge; else go to step 1606.

Step 1610: End.

The difference between the fourteen embodiment and the second embodiment is that in the fourteen embodiment, when reselecting a coordinator from each of the g wireless communications groups to generate g updated coordinators, because considering reducing the power dissipation of the transmission between the coordinator and the base station 80 as well as considering reducing the power dissipation of the transmission inside the wireless communications groups, a coordinator having a minimum sum of communications power dissipations between the coordinator and other wireless devices in the wireless communications group and between the coordinator and the base station 80 is selected from each of the wireless communications groups to generate g updated coordinators.

Figure 17:
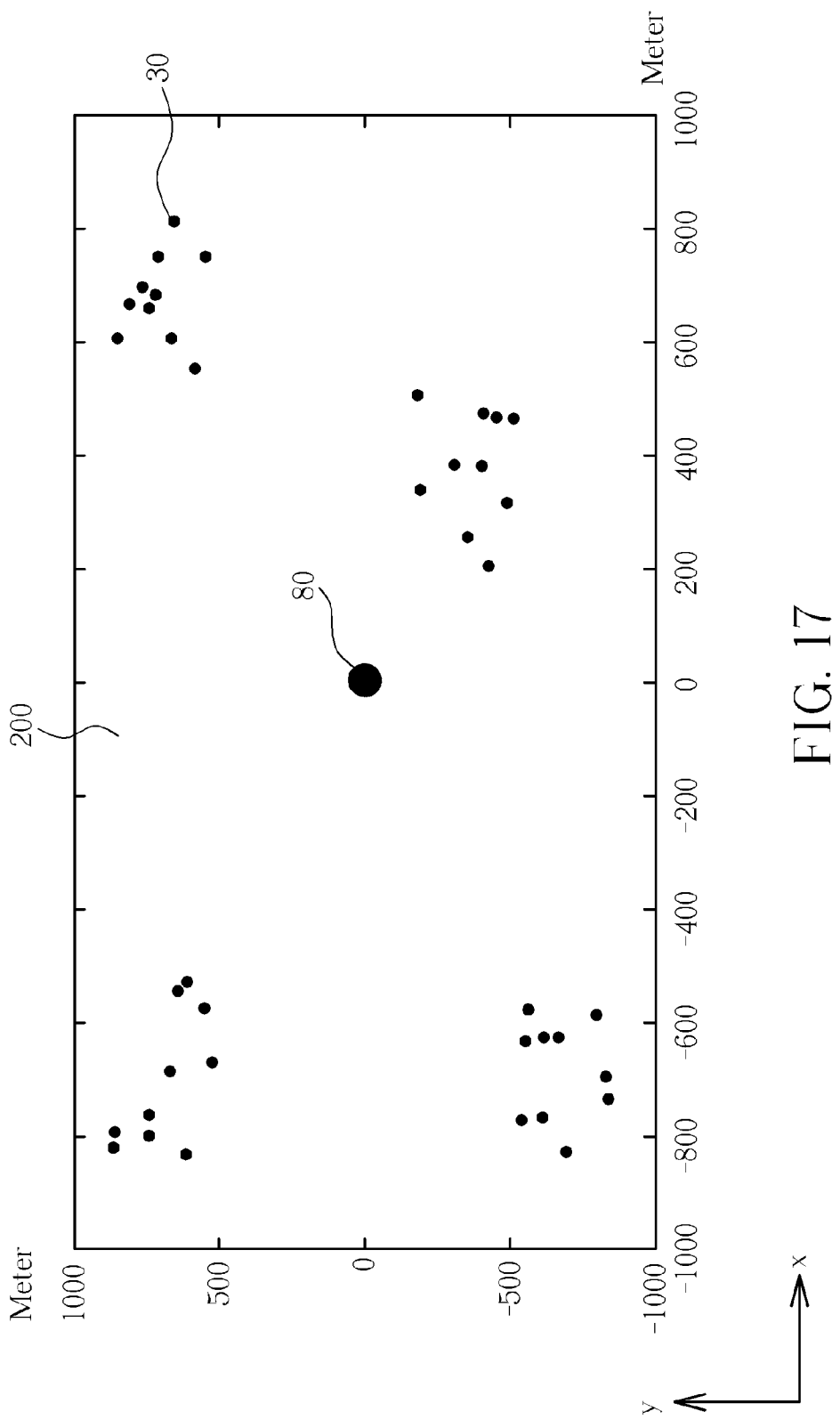
FIG. 17 shows the distribution of the base station and wireless communications devices in a wireless communications environment.
Figure 18:
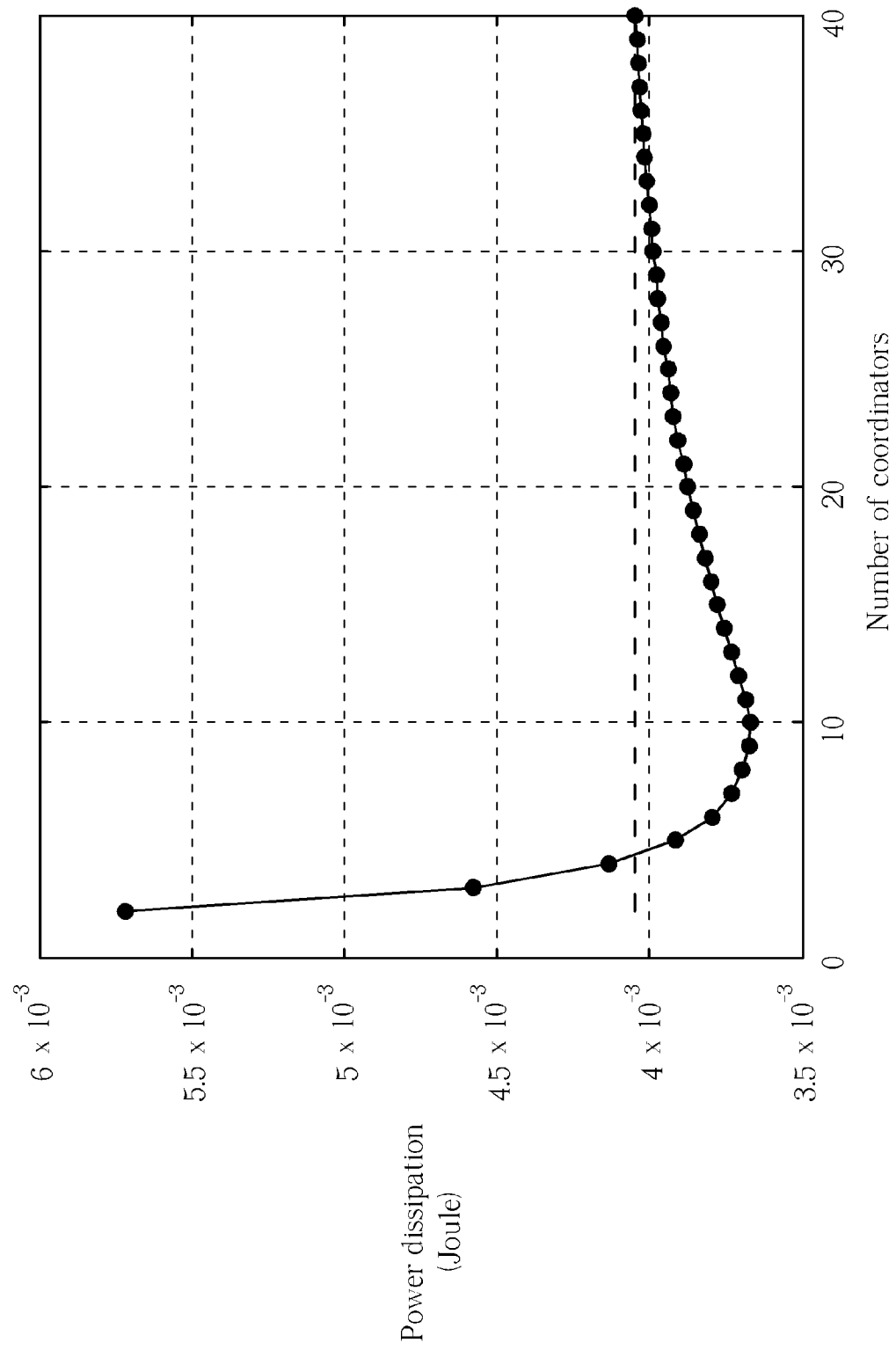
FIG. 18 is a simulation diagram showing reducing power dissipation by applying the third embodiment of the present application to the wireless communications environment in FIG. 17.
Figure 19:
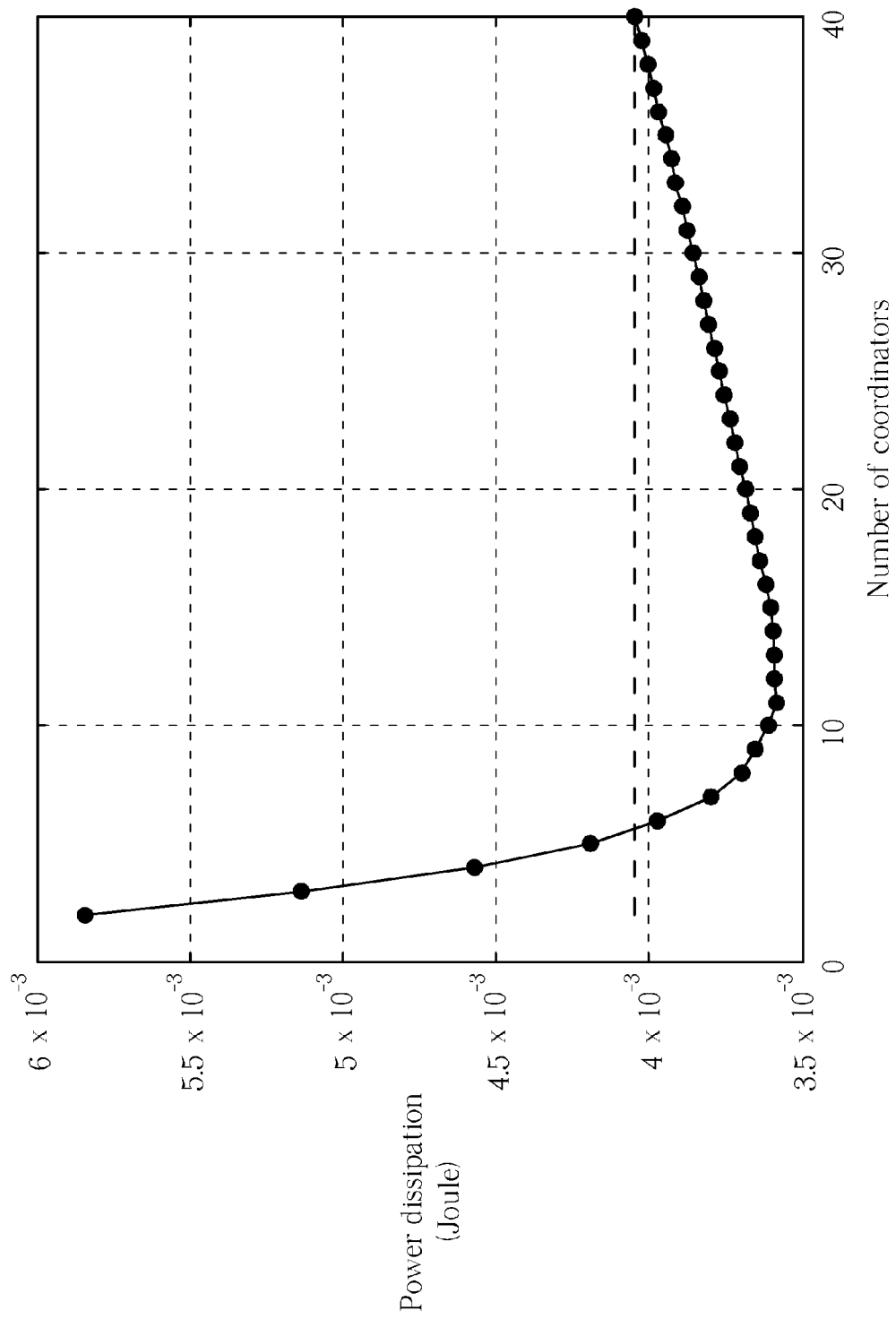
FIG. 19 is a simulation diagram showing reducing power dissipation by applying the fourth embodiment of the present application to the wireless communications environment in FIG. 17.
Figure 20:
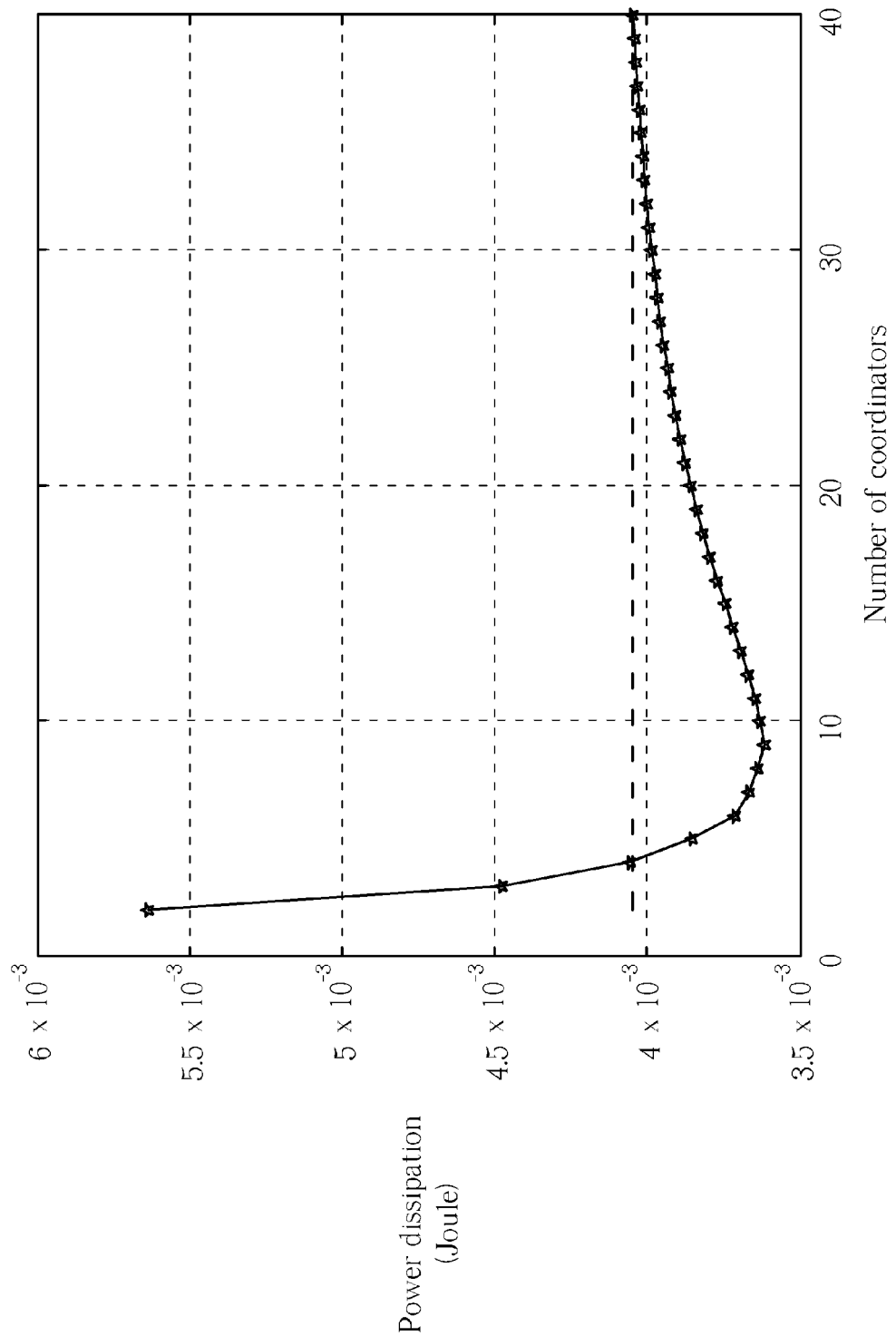
FIG. 20 is a simulation diagram showing reducing power dissipation by applying the thirteen embodiment of the present application to the wireless communications environment in FIG. 17.
Figure 21:
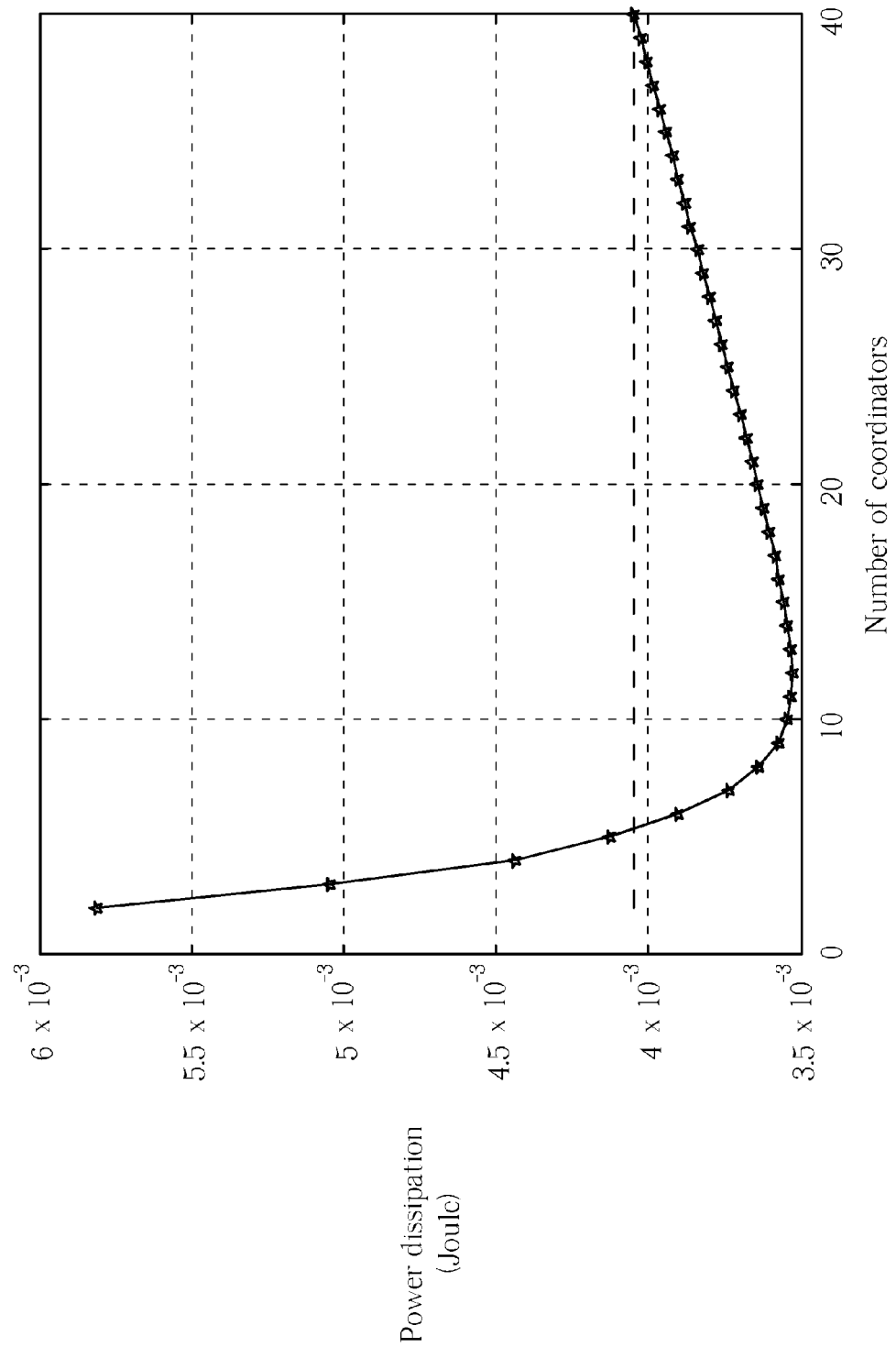
FIG. 21 is a simulation diagram showing reducing power dissipation by applying the fourteen embodiment of the present application to the wireless communications environment in FIG. 17.

Please refer to FIG. 17. FIG. 17 shows the distribution of the base station 80 and wireless communications devices 30 in a wireless communications environment 200. As shown in FIG. 17, a distance about 1000 meter around the base station 80 includes 40 wireless communications devices 30. Please also refer to FIGS. 18 to 21. FIG. 18 is a simulation diagram showing reducing power dissipation by applying the third embodiment of the present application to the wireless communications environment 200 in FIG. 17. FIG. 19 is a simulation diagram showing reducing power dissipation by applying the fourth embodiment of the present application to the wireless communications environment 200 in FIG. 17. FIG. 20 is a simulation diagram showing reducing power dissipation by applying the thirteen embodiment of the present application to the wireless communications environment 200 in FIG. 17. FIG. 21 is a simulation diagram showing reducing power dissipation by applying the fourteen embodiment of the present application to the wireless communications environment 100 in FIG. 17. In FIGS. 18 to 21, the horizontal axis along the x axis represents the number of selected coordinators, and the vertical axis along the y axis represents the magnitude of the power dissipation. The unit of the vertical axis is joule. The solid line in FIG. 18 denotes a curve showing the adjusted power dissipation of the transmissions between wireless communications devices 30 and the base station 80 after applying the method of the third embodiment of the present invention, the solid line in FIG. 19 denotes a curve showing the adjusted power dissipation of the transmissions between wireless communications devices 30 and the base station 80 after applying the method of the fourth embodiment of the present invention, the solid line in FIG. 20 denotes a curve showing the adjusted power dissipation of the transmissions between wireless communications devices 30 and the base station 80 after applying the method of the thirteen embodiment of the present invention, and the solid line in FIG. 21 denotes a curve showing the adjusted power dissipation of the transmissions between wireless communications devices 30 and the base station 80 after applying the method of the fourteen embodiment of the present invention. Each dotted line depicted in FIGS. 18 to 21 denote a curve showing the power dissipation of the transmissions between wireless communications devices 30 and the base station 80 caused by applying a prior art method that each wireless communications device 30 performs transmission to the base station 80 individually. It can be seen from FIGS. 18 to 21 that, through utilizing the third, fourth, thirteen and fourteen embodiments of the present invention, the power dissipation of the transmissions between wireless communications devices 30 and the base station 80 can be effectively reduced. Please notice that in FIGS. 18 to 21, when selecting 10 coordinators, there is great improvement in reducing the power dissipation of the transmissions between wireless communications devices 30 and the base station 80. However, if selecting 10 coordinators, it is equivalent to each of the 40 wireless communications devices 30 performs transmission to the base station 80 individually, thus the power dissipation is not reduced comparing with the prior art method.

In the embodiments provided by the present invention, the step of selecting coordinators in the wireless communications system and the step of grouping the wireless communications devices as wireless communications groups according to the selected coordinators are alternatively performed. After performing the above two steps, the wireless communications devices in the wireless communications device groups transmit signals to a coordinator first, and then the coordinator transmits the received signals to the base station 80, or the coordinator receives signals from the base station 80 first, and then transmits the received signals to the wireless communications devices in the wireless communications device groups. Besides, via grouping the wireless communications devices as wireless communications groups, the number of the wireless communications devices linking to the base station 80 can be limited, thus improving the efficiency of managing access to the wireless communications devices. Further, via selecting coordinators in the wireless communications devices, the uplink power dissipation of the wireless communications devices can be reduced, and the life span of the wireless communications devices can be extended.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for forming wireless communications groups, applied in a wireless communications system, the method comprising:

selecting g coordinators from n wireless communications devices near a base station;

after selecting g coordinators from n wireless communications devices, allocating remaining (n−g) wireless communications devices of the n wireless communications devices to the g coordinators to form g wireless communications groups;

reselecting a coordinator from each wireless communications group to generate g updated coordinators; and after reselecting g updated coordinators from each wireless communications group, allocating remaining (n−g) wireless communications devices of the n wireless communications devices to the g updated coordinators to form g updated wireless communications groups;

wherein g and n are positive integers.

2. The method of claim 1, wherein g is smaller than an upper limit.

3. The method of claim 1, wherein the step of allocating remaining (n−g) wireless communications devices of the n wireless communications devices to the g coordinators comprises:

allocating remaining (n−g) wireless communications devices of the n wireless communications devices to the g coordinators according to channel gains between remaining (n−g) wireless communications devices of the n wireless communications devices and the g coordinators.

4. The method of claim 1, wherein the step of allocating remaining (n−g) wireless communications devices of the n wireless communications devices to the g coordinators comprises:

allocating remaining (n−g) wireless communications devices of the n wireless communications devices to the g coordinators according to power dissipations between remaining (n−g) wireless communications devices of the n wireless communications devices and the g coordinators.

5. The method of claim 1, wherein the step of reselecting the coordinator from the wireless communications group comprises:

reselecting the coordinator from the wireless communications group having a maximum sum of channel gains with other wireless communications devices in the wireless communications group.

6. The method of claim 1, wherein the step of reselecting the coordinator from the wireless communications group comprises:

reselecting the coordinator from the wireless communications group having a maximum sum of an arithmetic mean of channel gains with other wireless communications devices in the wireless communications group and a weighted channel gain with the base station.

7. The method of claim 1, wherein the step of reselecting the coordinator from the wireless communications group comprises:

reselecting the coordinator from the wireless communications group having a maximum product of channel gains with other wireless communications devices in the wireless communications group.

8. The method of claim 1, wherein the step of reselecting the coordinator from the wireless communications group comprises:

reselecting the coordinator from the wireless communications group having a maximum sum of a geometric mean of channel gains with other wireless communications devices in the wireless communications group and a weighted channel gain with the base station.

9. The method of claim 1, wherein the step of reselecting the coordinator from the wireless communications group comprises:

reselecting the coordinator from the wireless communications group having a maximum channel gain with the base station.

10. The method of claim 1, wherein the step of reselecting the coordinator from the wireless communications group comprises:

reselecting the coordinator from the wireless communications group having a median channel gain with the base station.

11. The method of claim 1, wherein the step of reselecting the coordinator from the wireless communications group comprises:

reselecting the coordinator from the wireless communications group having a minimum sum of communications power dissipations between the coordinator and other wireless devices in the wireless communications group and between the coordinator and the base station.

12. The method of claim 1, wherein the step of selecting g coordinators from n wireless communications devices near the base station comprises:

randomly selecting g coordinators from n wireless communications devices near the base station.

* * * * *